United States Patent

McLean et al.

(10) Patent No.: US 8,972,433 B2
(45) Date of Patent: Mar. 3, 2015

(54) SYSTEMS AND METHODS FOR PROGRAMMATIC GENERATION OF DATABASE STATEMENTS

(75) Inventors: Scott McLean, Parrish, FL (US); Keith Folsom, Bradenton, FL (US); Gabriel Clough, Bradenton, FL (US)

(73) Assignee: Travelport Operations, Inc., Parsippany, NJ (US)

( * ) Notice: Subject to any disclaimer, the term of this patent is extended or adjusted under 35 U.S.C. 154(b) by 150 days.

(21) Appl. No.: 12/738,350

(22) PCT Filed: Apr. 17, 2009

(86) PCT No.: PCT/US2009/002425
§ 371 (c)(1),
(2), (4) Date: Dec. 17, 2010

(87) PCT Pub. No.: WO2009/145858
PCT Pub. Date: Dec. 3, 2009

(65) Prior Publication Data
US 2011/0113054 A1    May 12, 2011

Related U.S. Application Data

(60) Provisional application No. 61/045,998, filed on Apr. 18, 2008.

(51) Int. Cl.
*G06F 7/00* (2006.01)
*G06F 17/30* (2006.01)

(52) U.S. Cl.
CPC ................ *G06F 17/30932* (2013.01)
USPC .......................................... 707/760; 707/769

(58) Field of Classification Search
CPC .......... G06F 17/30427; G06F 17/3043; G06F 17/30389; G06F 17/30433; G06F 17/30932; G06F 17/30545; G06F 17/30477; G06F 17/30424; G06F 9/46; G06F 9/44; G06F 8/76; H04L 63/10
See application file for complete search history.

(56) References Cited

U.S. PATENT DOCUMENTS

| | | | |
|---|---|---|---|
| 5,446,885 A * | 8/1995 | Moore et al. ........................... 1/1 |
| 5,499,371 A * | 3/1996 | Henninger et al. ............ 717/108 |
| 5,546,576 A * | 8/1996 | Cochrane et al. ...................... 1/1 |
| 6,016,488 A * | 1/2000 | Bosworth et al. ...................... 1/1 |
| 6,081,801 A * | 6/2000 | Cochrane et al. ...................... 1/1 |
| 6,144,956 A * | 11/2000 | Yajima et al. .......................... 1/1 |
| 6,278,992 B1 * | 8/2001 | Curtis et al. ................... 707/711 |
| 6,292,830 B1 * | 9/2001 | Taylor et al. .................. 709/224 |
| 6,505,205 B1 * | 1/2003 | Kothuri et al. ......................... 1/1 |
| 6,795,825 B2 * | 9/2004 | Rishe .................................... 1/1 |
| 7,013,306 B1 * | 3/2006 | Turba et al. ............................ 1/1 |
| 7,233,952 B1 * | 6/2007 | Chen ..................................... 1/1 |
| 7,333,982 B2 * | 2/2008 | Bakalash et al. .............. 707/600 |
| 7,512,609 B2 * | 3/2009 | McConnell ........................... 1/1 |
| 2002/0107840 A1 * | 8/2002 | Rishe ................................. 707/3 |
| 2002/0184401 A1 * | 12/2002 | Kadel et al. .................... 709/315 |
| 2004/0215658 A1 * | 10/2004 | Carnegie et al. ........... 707/104.1 |
| 2005/0256889 A1 * | 11/2005 | McConnell .................... 707/100 |
| 2006/0165476 A1 * | 7/2006 | Lin .................................. 403/94 |
| 2006/0195476 A1 * | 8/2006 | Nori et al. .................. 707/104.1 |
| 2007/0112827 A1 * | 5/2007 | Dettinger et al. ............. 707/102 |

* cited by examiner

*Primary Examiner* — Daniel Kuddus

(57) ABSTRACT

Computer-based systems and methods for programmatically generating code, such as Structure Query Language (SQL) code to perform an operation on a database. A code generation engine, referred to herein as an Alchemy engine, receives a request in a first language, such as an XML-based language, and translates the request into a second language, such as an SQL-based language. The translation process utilizes information stored in a metadata database.

13 Claims, 12 Drawing Sheets

SYSTEMS AND METHODS FOR PROGRAMMATIC GENERATION OF DATABASE STATEMENTS

CROSS REFERENCE TO RELATED APPLICATION

This application is a U.S. national stage application of International Application No. PCT/US2009/002425, filed Apr. 17, 2009, having an International Publication Number of WO 2009/145858 and an International Publication Date of Dec. 12, 2009, which claims priority to U.S. Provisional Application No. 61/045,998, filed Apr. 18, 2008, which is hereby incorporated by reference in its entirety.

BACKGROUND

Databases are computerized information storage and retrieval systems. A relational database management system is a computer database management system (DBMS) that uses relational techniques for storing and retrieving data. A prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Regardless of the particular architecture, in a DBMS, a requesting entity (e.g., an application or the operating system) demands access to a specified database by issuing a database access request. Such requests may include, for instance, catalog lookup requests or transactions and combinations of transactions that operate to delete, read, change, and add specified records in the database.

FIGURES

Various embodiments of the present invention are described herein by way of example in conjunction with the following figures wherein.

DESCRIPTION

Figure 1:
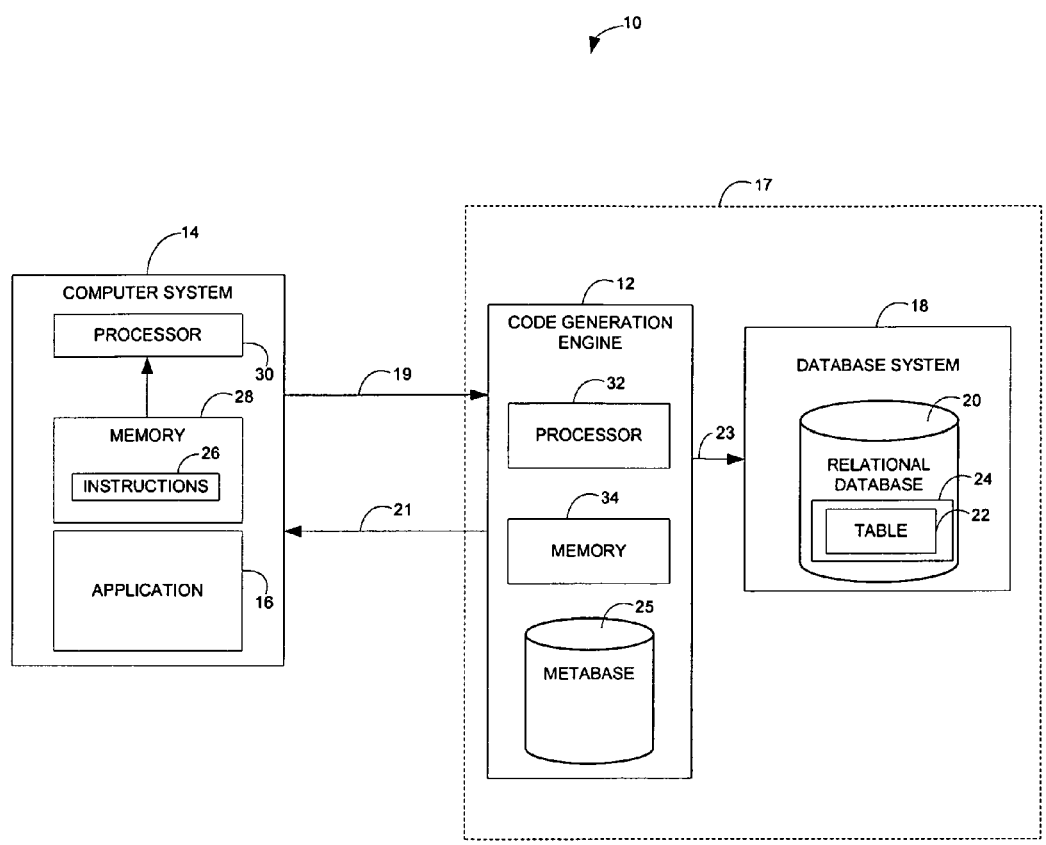
FIG. 1 is a block diagram of a system according to various embodiments.

An embodiment is directed to a computer-implemented engine that programmatically generates software code, such as SQL code. FIG. 1 is a diagram of a computer system 10 employing such a code generation engine 12, according to various embodiments. As shown in FIG. 1, the code generation engine 12, such as a programmatic SQL code generation engine, is in communication with a server 14 (or other type of computer device) running an application 16 that requires data from a database system 18. The code generation engine 12 is referred to sometimes hereinafter as the "Alchemy Engine," as "Alchemy" is the name given in one embodiment to the declarative computer language that allows the expression of desired data in terms similar to SQL but at a higher level of abstraction.

A computer system 14, may be, for example, a web server running ASP.net, and the application 16 may be, for example, a web application. The computer system 14 may be a front-end system that requests services of a back end, such as a database system 18. The database system 18 may be a database system that uses SQL to query data in a database 20. In one embodiment, the database 20 is a relational database. The database 20 may comprise at least one table 22. The data stored in the database 20 may be stored in a non-volatile computer memory 24, such as a hard disk drive, a read only memory structure (e.g., a ROM IC), or other types of non-volatile memory. The database 20 may receive the information through any suitable techniques, such as through a computer network connection or from an optical disk, for example. The computer system 10 may further comprise a metabase 25 associated with the code generation engine 12. The metabase 25 may be used to store information and data regarding the processes and algorithms implemented by the code generation engine 12. In various embodiments, the database system 18 may comprise the metabase 25.

The computer system 14 may be any suitable computer-based device or system, such as a personal computer, a laptop, a server, a mainframe, etc. Software with instructions 26 for the application 16 may be stored on a computer memory 28 associated with the computer system 14. A processor 30 of the computer system 14 may execute the instructions. The instructions, when executed by the processor 30, may cause the processor 30 to execute the application, which may involve retrieving data from the database system 18. The computer system 14 may comprise one or more processors 30 and one or more computer memories 28. For convenience, only one processor 30 and only one memory 28 are shown in FIG. 1. The processor 30 may be implemented as an integrated circuit (IC) having one or multiple cores. The memory 28 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

According to various embodiments, the application 16 may access the code generation engine 12 and the database system 18 using a request 19. The request 19 may be based in any suitable programming language, such as XML. As discussed in more detail below, the code generation engine 12 may then translate the request from the application 16 to a suitable data query 23 to query data from the database system 18. According to various embodiments, the data query 23 may be a SQL statement or SQL script (e.g., a PL/SQL block) that is used by the database system 18 to query data in the database 20. The system 10 may then return the results of the data query to the application 16 in a result set 21, which may be processed by the application 6, for example. The code generation engine 12 may be integrated into the database system, shown as block 17, or the code generation engine 12 may be a stand alone component. In various embodiments, parts of the code generation engine 12 may be part of the database system 18 while other parts are not part of the database system 18. In various embodiments the code generation engine 12 may be part of the computer system 14.

The code generation engine 12 may be implemented using a computer device, such as a server or a network of servers (e.g., a server farm). The code generation engine 12 may comprise one or more processors 32 and one or more computer memories 34. For convenience, only one processor 32 and only one memory 34 are shown in FIG. 1. The memory 34 may comprise software code, which when executed by the processor 32, causes the processor 32 to covert the request 19 from the computer system 14 to the data query 23. The memory units 34 may comprise any suitable computer readable media, such as ROM and/or RAM. The software code may be written in any suitable computer language.

Figure 2:
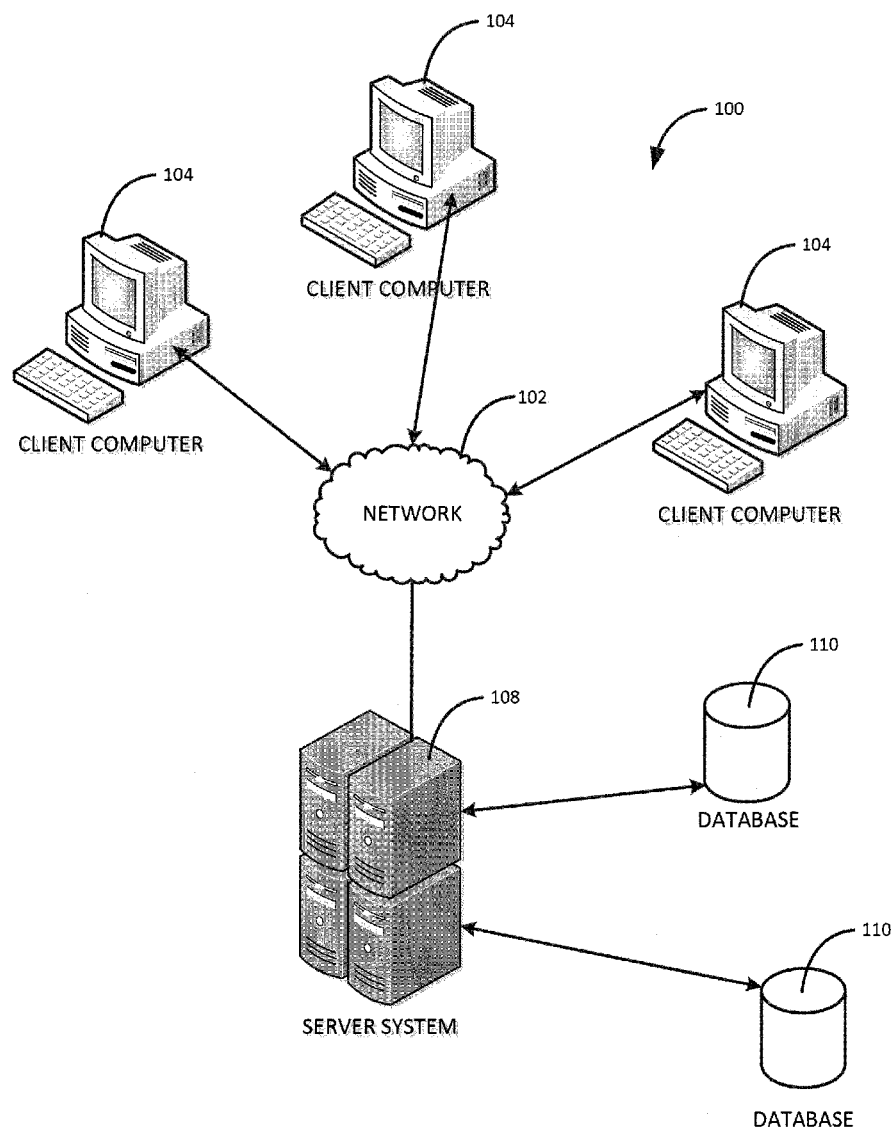
FIG. 2 illustrates a hardware environment of one embodiment.

FIG. 2 schematically illustrates an embodiment of a hardware environment 100 for implementation of the systems and methods disclosed herein. The hardware environment 100 illustrates a distributed computer system using an electronic data communications network 102 to connect client computers 104 executing client applications to a server system 108, which is connected to a database 110. In various embodiments, the client computers 104 are personal computers or workstations, for example. The network 102 may comprise a LAN, WAN, SNA network, and/or the Internet, for example. Each client computer 104 and the server system 108 additionally may comprise an operating system and one or more computer programs, memory circuits, and processor circuits.

A client computer 104 may execute a client application and may be coupled to a server system 108 executing one or more server software. The server system 108 may include the code generation engine 12 (FIG. 1). As may be appreciated, the server system 108 may also use a data store interface and, possibly, other computer programs, for connecting to the database 110. While two databases 110 are illustrated in FIG. 2, it is appreciated that more or fewer databases 110 may be used in various implementations. Data may be stored in the databases 110.

The server system 108 may be connected to or include a Database Management System (DBMS), which supports access to the databases 110 by executing, for example, relational database management system (RDBMS) software. The DBMS may be located at the server system 108 or may be located on one or more separate machines, for example. The databases 110 may be geographically distributed.

The operating system and computer programs are comprised of instructions which, when read and executed by the client and server computers 104 and 108, cause the client and server computers 104 and 108 to perform steps to implement and/or use the systems and methods disclosed herein. Generally, the operating system and computer programs are tangibly embodied in and/or readable from a device or media, such as memory, other data storage devices, and/or data communications devices. Under control of the operating system, the computer programs may be loaded from memory, other data storage devices and/or data communications devices into the memory of the computer for use during actual operations.

Figure 3:
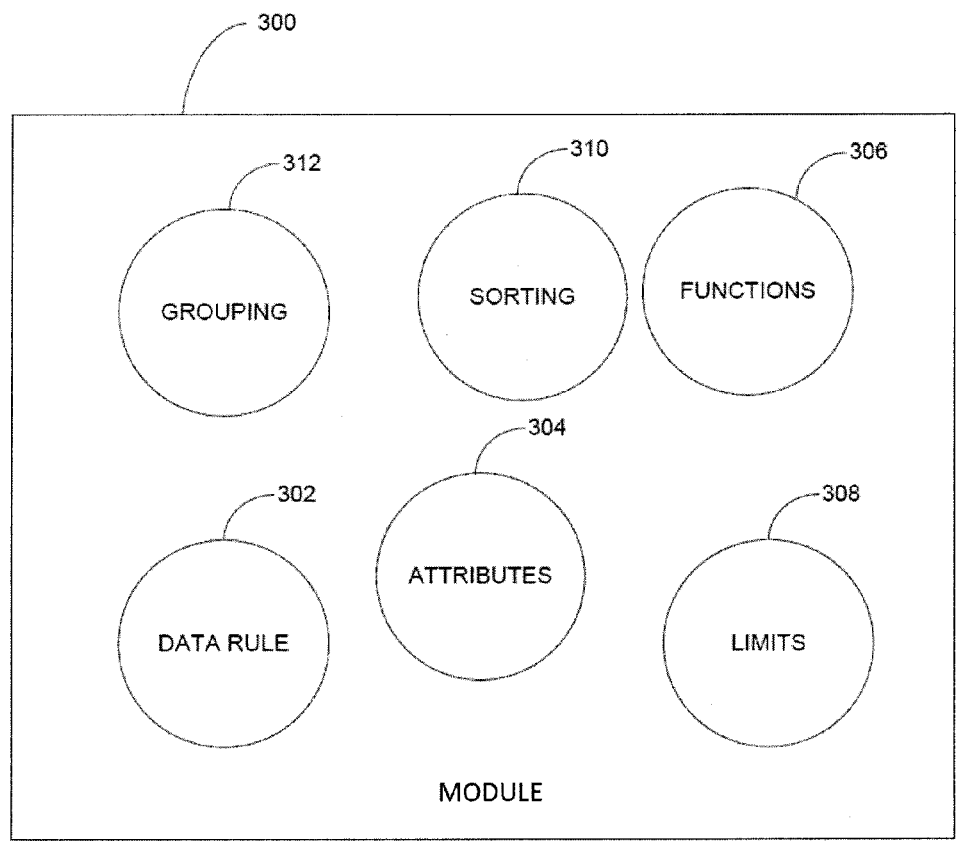
FIG. 3 is an Alchemy module according to one embodiment.

The code generation engine 12 may be created or generated using a computer programming language, referred to herein as Alchemy™. In various embodiments, the Alchemy language is XML-based. In one embodiment, Alchemy allows the code generation engine 12 to express common SQL operations (e.g., select, insert, update, delete) as well as more advanced SQL operations (e.g., invoking stored procedures, producing analytic queries vs. non-analytic queries). Referring to FIG. 3, the Alchemy language, illustrated as a module 300, may express the SQL operations using a combination of data rules 302, attributes 304, functions 306, limits 308, sorting 310, and grouping 312.

In various embodiments, the Alchemy language is a declarative computer language that provides the ability to request data from the database system 18 (FIG. 1) at a higher level of abstraction that traditional SQL. Thus, the Alchemy language insulates the calling code from changes to the underlying database structure and allows for a small set of expressions to be combined together dynamically to serve a large number of query combinations.

Table 1 is an example table of data that may be stored in the database 18 (FIG. 1). In this table, customer information is shown, although it is appreciated that any information may be stored in tabular form.

TABLE 1

| ID | FirstName | LastName |
|---|---|---|
| 1001 | John | Smith |
| 1002 | Jane | Doe |
| 1003 | Roger | Moore |

Given the information in Table 1, a SQL developer might develop the SQL statement shown below to query Table 1 for the First Name, Last Name, and Full Name of each customer:

```
select    FirstName,
LastName,
CONCAT(CONCAT(FirstName, ' '), LastName) FullName
from Customers
```

As may be appreciated by those skilled in the art, in the code above, CONCAT is a SQL function that concatenates the first parameter with the second. Executing this SQL statement would achieve a result set shown in Table 2.

TABLE 2

| FirstName | LastName | FullName |
|---|---|---|
| John | Smith | John Smith |
| Jane | Doe | Jane Doe |
| Roger | Moore | Roger Moore |

As illustrated in FIG. 3, the Alchemy language is based on the following terms: data rules, attributes, functions, limits, sorting, and grouping. Each of these terms are discussed in more detail below.

Data Rules

A data rule represents a conceptual entity with a database, such as "customer", "client", "employee", for example. The data rule contains data elements relating to a business problem domain. Generally, a data rule may be analogous to a database table, however, a data rule may represent an entity whose data elements may be distributed across a plurality of tables and/or a plurality of databases. The data rule allows a high level representation of a query to be defined. Since data rules are capable of bringing many types of information together dynamically, a single data rule may support many different queries.

Data rules may represent a fundamental entity on which something of value may be reported from the data warehouse or database. Furthermore, the data rule may be used to perform an operation (e.g., summation, average, for example) in order to derive a specific result within a problem domain.

For example, referencing Table 1, a sample data rule representing "customers" (and any related tables) in order to obtain various data elements may be defined for Customers such as the First Name, Last Name, or Full Name. Although in this example the data rule is tied to Table 1, it is appreciated that a single data rule may be tied to many tables. Table 3 shows an example data rule named "Customers."

TABLE 3

| Data Rule ID | Data Rule Name | Description |
|---|---|---|
| 1000 | Customers | A data rule for querying customer data |

To access this data rule using the Alchemy language, the following XML code for the request 19 (FIG. 1) may be utilized:

```
<DATA_RULE name="Customers" operation="Select" version="1">
<-- Place holder for Attributes, Functions, Limits -->
</DATA_RULE>
```

In this example, the XML element which references the data rule is called "DATA_RULE." Starting and ending tags, and additional elements, such as attributes, functions, and limits, may also be specified within the data rule request. These elements are discussed in more detail below. The example XML element presented herein contains the following attributes:

1) Name: This XML attribute may specify the name of the data rule being accessed.

2) Operation: This XML attribute may specify the type of operation the request should perform. Available operations may be defined at the data rule level. In various embodiments, operations may be named select, insert, update, and delete, for example, but the names are arbitrary. For example, for a particular data rule, operations may be named "DeleteCustomerByName" and "DeleteCustomerByID."

3) Version: This XML attribute may specify a specific implementation of the data rule.

Attributes

As discussed above, a data rule may be comprised of Alchemy attributes. An Alchemy attribute represents data associated with a conceptual entity. Alchemy attributes are analogous to columns in a database table, however, Alchemy attributes are not necessarily strictly mapped to a single table column.

In various embodiments, Alchemy attributes that represent data that is stored in a database, such as database 18 (FIG. 1), referred to herein as an intrinsic attribute. For example, the first name of a customer may be considered an intrinsic attribute. Derived attributes, in contrast, are Alchemy attributes derived from one or more intrinsic attributes. For example, a full name alias constructed from the concatenation of FirstName and LastName together (Table 2) may be a derived attribute.

Table 4 defines three exemplary Alchemy attributes on the Customer Date Rule:

TABLE 4

| Data Rule ID | Attribute Name | Type | Translation Formula (SQL) "[DataSouce.Column]" |
|---|---|---|---|
| 1000 | FirstName | String | Customers.FirstName |
| 1000 | LastName | String | Customers.LastName |
| 1000 | FullName | String | CONCAT(CONCAT(Customers.FirstName, ' '), Customers.LastName) |

In this embodiment, a translation formula column maps an Alchemy attribute name to a partial SQL statement, or an "SQL snippet." The SQL snippet contains the string which will be used when constructing the SQL statement to execute. It can contain field names, table aliases prefixes (to avoid name collisions), SQL function, or macros, for example.

To access an Alchemy attribute using the Alchemy language, the following XML code may be used as part of request 19 (FIG. 1):

```
<ATTRIBUTE name="attrib_metaname" alias=
"output_alias_name"/>
```

The XML element which references an attribute may be called "ATTRIBUTE", for example. The element may be followed at least by the following XML attributes:

1) Name: This XML attribute may specify the name of the data rule attribute being accessed.

2) Alias: This XML attribute may specify the name of the column in the result set that corresponds to this Alchemy attribute.

In various embodiments, "Alias" may be the same as "Name" if there is no desire to override the attribute name.

Functions

In various implementations, a database may not contain all the data elements necessary to support a specific implementation. Any missing data elements must be derived from other data elements by performing a function on one or more elements that are present in the database.

For example, in various embodiments, there may be a need to convert the LastName column to upper case. This need could be achieved in a variety of ways. For instance, the Customers Data Rule may be modified to support a "LastNameInUpperCase" attribute whose translation formula applies an upper case function to the result of the LastName translation formula. Alternatively, a function may be defined that takes the name of an attribute as a parameter and passes that parameter to a SQL upper case function.

If a function is used, for example, a generic "ToUpper" Function could be defined to allow performing an UpperCase operation on any compatible attribute defined on any data rule. Functions may be global to all data rule definitions, or functions may be associated with specific data rules. Table 5 provides example functions.

TABLE 5

| Function ID | Function Name | Return Type | Input Parameter Name(s) | Translation Formula (SQL) |
|---|---|---|---|---|
| 200 | ToUpper | String | $a$ | UPPER($a$) |
| 201 | Add | Number | $a$, $b$ | $a$ + $b$ |
| 202 | Substr | String | $a$, $b$, $c$ | SUBSTR($a$, $b$, $c$) |

The Input Parameter Name(s) may be used as place holders for Data Rule Attributes or literal values. If a parameter is determined to be an XML attribute, the $param_name$ (e.g., $a$) reference may be replaced by the attribute alias. For literals, a direct replacement may occur between the parameter name and the literal string or numeric.

In order to use the ToUpper function, for example, the name of an attribute (or an attribute/function alias) which exists on the data rule may be supplied as an input parameter to the function. Once invoked, the ToUpper translation formula results in a call to the SQL 'UPPER' function passing whatever data rule attribute alias is supplied in the input parameter $a$. To access a function using the Alchemy language, the following XML code may be used as part of request 19 (FIG. 1):

```
<FUNCTION meta="function_metaname"
  alias="output_alias_name">
  <PARAMS>
    <PARAM meta="param_name"
      value="$input_alias_name$"/>
  </PARAMS>
</FUNCTION>
```

The XML element which references a function is called "FUNCTION." The element may be followed at least by the following XML attributes:

1) Meta: This XML attribute may specify the function name.

2) Alias: This XML attribute may specify the name of the column in the result set that corresponds to this Alchemy attribute.

A "PARAMS" section may be required for all incoming parameters into the function. The number of required parameters in the parameter list may be based on the function definition. In the case of "UPPER", for example, one parameter (i.e., $a$) is required.

Table 6 provides example functions based on attributes.

TABLE 6

| Attribute (A) or Function (F) | Meta Name | Input Parameter | Translation Formula (SQL) |
|---|---|---|---|
| A | LastName | N/A | Customer.LastName |
| F | UPPER | cLastName | UPPER(Customers.LastName) |

To request the attributes and functions as defined in Table 6, in various embodiments, the following Alchemy statement may be used as part of request 19 (FIG. 1):

```
<DATA_RULE name="Customers" operation="Select" version="1">
<ATTRIBUTES>
<ATTRIBUTE meta="LastName" alias="LastName" />
<!-- Apply UPPER function to the LastName -->
<FUNCTION meta="UPPER" alias="LastNameUpper">
  <PARAMS>
    <PARAM meta="a" value="$LastName$"/>
  </PARAMS>
</FUNCTION>
</ATTRIBUTES>
</DATA_RULE>
```

Given this example request, a corresponding generated (or translated) SQL query may look similar to the following:

```
SELECT Customers.LastName cLastName,
       UPPER(Customers.LastName) cLastNameUpper
FROM Customers
```

Furthermore, depending on the algorithm used to generate the SQL, as discussed in more detail below, an alternative SQL generation using sub-selects may yield:

```
SELECT level_1.*,
       UPPER(cLastName) cLastNameUpper
FROM
(
   SELECT
      t1.LastName cLastName
   FROM
      Customers t1
) level_1
```

Limits

For some applications, the result set of a statement (i.e., a query) can be limited by one or more conditions. In SQL, results are usually limited by using the "where" clause of the SQL select statement. For example, all customers whose FirstName is "John" may be selected using the following SQL statement:

```
Select *
From Customers
Where FirstName = 'John'
```

As in SQL, a limit concept may be implemented using Alchemy to constrain the result set.

Limits may be applied to a particular Alchemy attribute (i.e., an inline limit) or an Alchemy attribute or function at the request level (i.e., a global limit). Inline limits may be used when the conditional return of certain values for a field without affecting the number of rows returned is desired. Global limits govern the returned result set, discarding the rows that do not match the limit.

In comparison to SQL syntax, global limits are extensions of the SQL WHERE clause, whereas inline limits are closely linked to SQL CASE or SQL DECODE functions on a specific field. Further, while most limits may be global by nature, inline limits are particularly useful when creating cross tabular reports.

To access a limit using the Alchemy language, the following code may be used as part of request 19 (FIG. 1):

```
<LIMITS>
        <LIMIT type="limit_type" meta="input_alias_name">
            <PARAMS>
                <PARAM meta="a" value="limit_criteria_value"/>
            </PARAMS>
        </LIMIT>
</LIMITS>
```

In one embodiment, the XML element which references a function is called "LIMIT." In various embodiments, if the limit tags are embedded within an attribute's opening and closing tags, the limit is considered an inline limit. If the limit tags are not embedded within an attribute, an instead found within the "DATA_RULE" element, it is a global limit. The limit declaration may include at least the following XML attributes:

1) Type: This XML attribute may specify the type of limit to apply.
2) Meta: This XML attribute may specify the alias of an attribute on which the limit will apply.
3) Alias: This XML attribute may specify the alias of an attribute or function.

Similar to the data rule function, a "PARAMS" section may be required. The parameter list determines the filter criteria that will be used when a limit is applied.

Continuing with the customer example above, the following data rule demonstrates an example global limit on the FirstName attribute as part of request 19 (FIG. 1):

```
<DATA_RULE
name="Customers"
operation="Select"
version="1">
    <ATTRIBUTES>
        <ATTRIBUTE meta="FirstName" alias="cFirstName" />
        <ATTRIBUTE meta="LastName" alias="LastName" />
        <LIMITS>
            <LIMIT type="EQUAL" meta="FirstName">
                <PARAMS>
                    <PARAM meta="a" value="John"/>
                </PARAMS>
            </LIMIT>
        </LIMITS>
    </ATTRIBUTES>
</DATA_RULE>
```

In this example, only records with FirstName='John' will be returned.

The syntax for applying an inline limit on FirstName may be implemented as follows:

```
<DATA_RULE
name="Customers"
operation="Select"
version="1">
    <ATTRIBUTES>
        <ATTRIBUTE meta="FirstName" alias="FirstName">
            <LIMITS>
                <LIMIT type="EQUAL" meta="LastName">
                    <PARAMS>
                        <PARAM meta="a" value="Smith"/>
                    </PARAMS>
                </LIMIT>
            </LIMITS>
        </ATTRIBUTE>
        <ATTRIBUTE meta="LastName" alias="LastName" />
    </ATTRIBUTES>
</DATA_RULE>
```

In this example, there is no global limit and therefore potentially all rows could be returned. Records that have LastName "Smith" will show a first name field (otherwise the field will be null) and LastName will be shown in all cases.

In another example, inline and global limits may be used to produce a query that selects the total money spent by customers for each month between January and February of 2005. In this example, an inline limit rather than a global limit may be used. The following syntax provides an example data rule request to achieve such a query as part of request 19 (FIG. 1):

```
<DATA_RULE
name="Customers"
operation="Select"
version="1">
    <ATTRIBUTES>
        <ATTRIBUTE meta="FirstName" alias="FirstName">
        <ATTRIBUTE meta="LastName" alias="LastName" />
        <ATTRIBUTE meta="TotalSales" alias="TotalSalesJanuary2005">
            <LIMITS>
                <LIMIT type="BETWEEN" meta="SalesDate">
                    <PARAMS>
                        <PARAM meta="a" value="01-JAN-2005"/>
                        <PARAM meta="b" value="31-JAN-2005"/>
                    </PARAMS>
                </LIMIT>
            </LIMITS>
        </ATTRIBUTE>
        <ATTRIBUTE meta="TotalSales" alias="TotalSalesFebruary2005">
            <LIMITS>
                <LIMIT type="BETWEEN" meta="SalesDate">
                    <PARAMS>
                        <PARAM meta="a" value="01-FEB-2005"/>
                        <PARAM meta="b" value="28-FEB-2005"/>
                    </PARAMS>
                </LIMIT>
            </LIMITS>
        </ATTRIBUTE>
    </ATTRIBUTES>
</DATA_RULE>
</LIMIT>
```

Sorting

SQL provides the ORDER BY clause in a SELECT statement to sort the result set by one or more columns. The syntax allows for indicating whether to sort the data in ascending order or descending order. For example:

```
Select *
FROM Customers
ORDER BY Customers.FirstName DESC, Customers.LastName ASC
```

This SQL query might return the results in Table 7:

TABLE 7

| FirstName | LastName |
|---|---|
| Roger | Moore |
| John | Williams |
| Jane | Doe |
| Jane | Kirkland |

In various embodiments, Alchemy also provides the order-by statement to allow sorting by any columns in the result set. To utilize an order-by within the Alchemy language, the following XML code, or any other suitable type of code, may be utilized:

```
<ORDER_BY>
    <PARAMS>
        <PARAM meta="input_alias_name" value="sort-direction"/>
    </PARAMS>
</ORDER_BY>
```

The XML Element which references an order by may be called "ORDER_BY".

This element may be followed by a "PARAMS" section which specifies the alias and direction to sort.

Based on previous examples, the request 19 (FIG. 1) may include a data rule request that provides an order by condition may be written as follows:

```
<DATA_RULE
    name="Customers"
    operation="Select"
    version="1">
    <ATTRIBUTES>
        <ATTRIBUTE meta="FirstName" alias="FirstName">
        <ATTRIBUTE meta="LastName" alias="LastName" />
    </ATTRIBUTES>
    <ORDER_BY>
        <PARAMS>
            <PARAM meta="FirstName" value="DESC"/>
            <PARAM meta="LastName" value="ASC"/>
        </PARAMS>
    </ORDER_BY>
</DATA_RULE>
```

Grouping

With SQL, it is sometimes useful to provide an aggregation of data. For example, it may be beneficial to sum the total amount of orders placed in a given month. For such grouping, the following SQL code may be used;

```
Select Month, SUM(OrderAmount)
From Orders
Group By Month
```

This SQL query might return the results in Table 8:

TABLE 8

| Month | SUM(OrderAmount) |
|---|---|
| 1 Feb. 2009 | 1230 |
| 1 Mar. 2009 | 1234 |
| 1 Apr. 2009 | 1753 |

TABLE 8-continued

| Month | SUM(OrderAmount) |
|---|---|
| 1 May 2009 | 2300 |
| 1 Jun. 2009 | 1902 |

In embodiments of Alchemy, grouping based on aggregate functions is implicit and automatic. The code generation engine 12 (FIG. 1) looks for use of aggregating functions in the attribute translation formula and applies grouping whenever an aggregation function is used. Accordingly, in various embodiments, no explicit syntax for grouping is used in Alchemy.

Alchemy Syntactical Grammar

In various embodiments, Alchemy requests may be created in XML for input into the code generation engine 12 (FIG. 1), which may be referred to in various embodiments as an Alchemy-to-SQL translator. The syntactic grammar for the syntax of the Alchemy language may consist of "grammar productions." A non-exhaustive list of example grammar productions is provided below:

```
request:
    request-begin requestor data-rule-list request-end
request-begin:
    <REQUEST request-xml-attribute-list>
request-end:
    </REQUEST>
request-xml-attribute-list:
    request-xml-attribute
    request-xml-attribute-list request-xml-attribute
request-xml-attribute:
    request_type = 'string-literal'
    debug = 'boolean-literal'
    sql_only = 'boolean-literal'
    save_results = 'boolean-literal'
    prev_request_id = 'numeric-literal'
    start_row = 'numeric-literal'
    end_row = 'numeric-literal'
    distinct_rows = 'boolean-literal'
requestor:
    <REQUESTOR> string-literal </REQUESTOR>
data-rule-list:
    data-rule
    data-rule-list data-rule
data-rule:
    data-rule-begin data-rule-children data-rule-end
data-rule-begin:
    <DATARULE datarule-xml-attribute-list>
data-rule-end:
    </DATARULE>
datarule-xml-attribute-list:
    datarule-xml-attribute
    datarule-xml-attribute-list datarule-xml-attribute
datarule-xml-attribute:
    name = 'string-literal'
    version = 'boolean-literal'
    operation = 'operation'
data-rule-children:
    params-list data-rule-children
    attribute-list data-rule-children
    function-list data-rule-children
    limit-expression-list data-rule-children
    group-by data-rule-children
custom operation:
    SELECT
    INSERT
    UPDATE
    DELETE
```

```
attribute-list:
    attribute
    attribute-list attribute
attribute:
    <ATTRIBUTE attribute-xml-attribute-list />
    <ATTRIBUTE attribute-xml-attribute-list > params
partition-by limit-expression-list </ATTRIBUTE>
attribute-xml-attribute-list:
    attribute-xml-attribute
    attribute-xml-attribute-list attribute-xml-attribute
attribute-xml-attribute:
    meta = 'string-literal'
    alias = 'string-literal'
    display = 'display-values'
    footer_value = 'string-literal'
    value = 'string-literal'
partition-by:
    <PARTITION_BY>params</PARTITION_BY>
display-values:
    none
    all
    footer1
    footer2
    footer3
    footer4
function-list:
    function
    function-list function
function:
    <FUNCTION function-xml-attribute-list>
    params </ FUNCTION >
    function-xml-attribute-list:
    type="string-literal"
    meta="string-literal"
limits-expression:
    limits-begin
    limits-expression-or-limit-list
    limits-end
limits-expression-or-limit-list:
    limits-expression limit-list
    limit-list
limits-begin:
    <LIMITS type='and-or'>
and-or:
    AND
    OR
limits-end:
    </LIMITS>
limit:
    <LIMIT limit-xml-attribute-list > params </LIMIT>
limit-xml-attribute-list:
    type="string-literal"
    meta="string-literal"
order-by:
    <ORDER_BY>params</ORDER_BY>
params:
    <PARAMS>param-list</PARAMS>
param-list:
    param
    param-list param
param:
    <PARAM meta="string-literal" value="string-literal" />
string-literal:
    Any sequence of alphanumeric characters
numeric-literal:
    Any sequence of numeric digits
```

Defining Translations from Alchemy to SQL

In various embodiments, Alchemy may require the creation of translation formulas to instruct the code generation engine how to convert various data rule elements, such as attributes, functions, and limits, for example, into syntactically correct SQL statements ready for execution.

Figure 4:
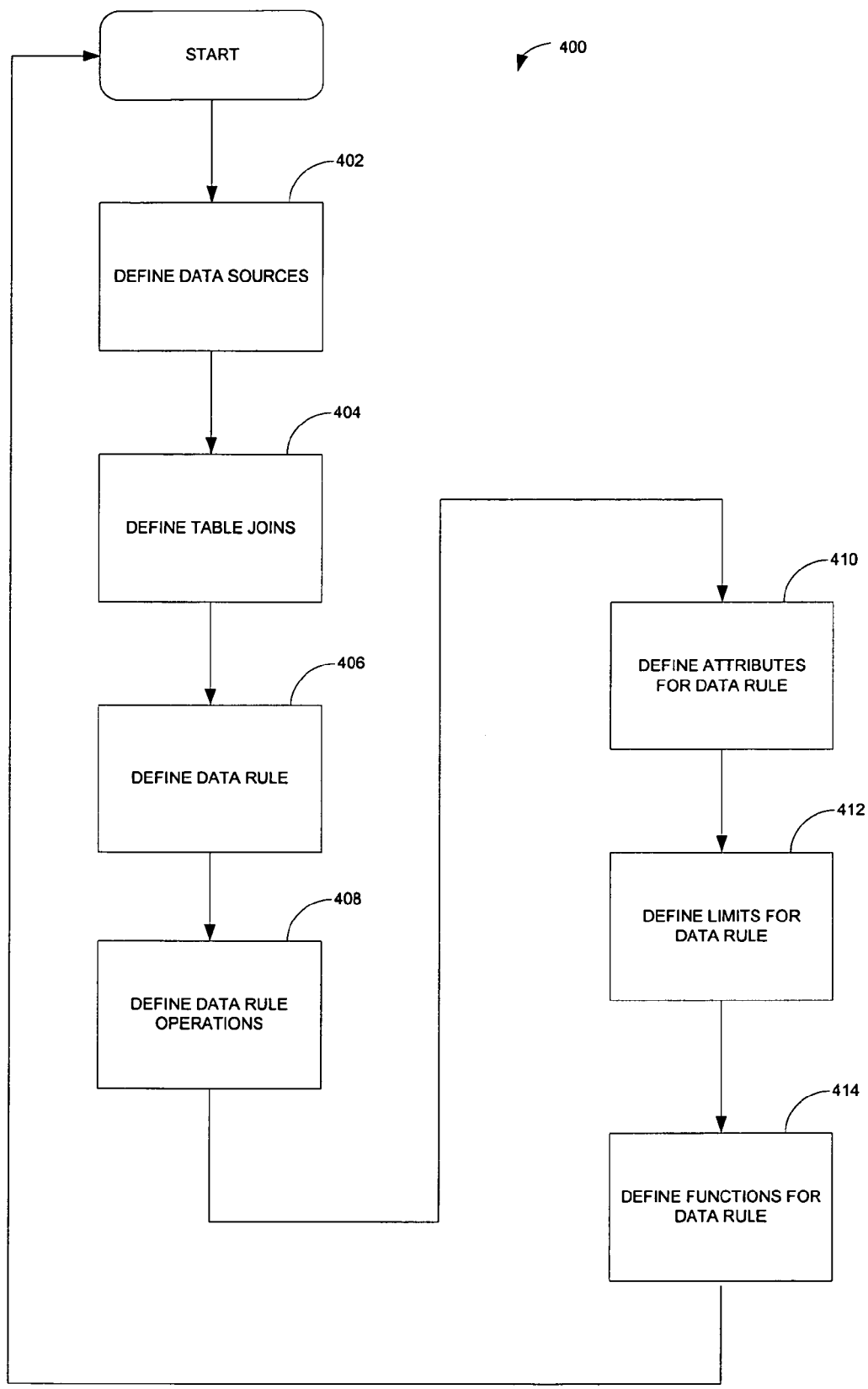
FIG. 4 is a flow diagram for programming the Alchemy engine with translation formulas according to one embodiment.

FIG. 4 illustrates an example process 400 for "programming" the Alchemy engine with translation formulas. As may be appreciated, the various steps of the process may be performed in any suitable order. In some embodiments, more or less steps may be used. At step 402, data sources are defined. At step 404, table joins are defined. At step 406, data rules are defined. At step 408, data rule operations are defined. At step 410, attributes for the data rules are defined. At step 412, limits for the data rules are defined. At step 414, functions for the data rules are defined.

These various steps may be demonstrated using a hypothetical customer order database containing Table 9 for customers and Table 10 for orders.

TABLE 9

| CustomerID | FirstName | LastName |
|---|---|---|
| 1001 | John | Smith |
| 1002 | Jane | Doe |
| 1003 | Roger | Moore |

TABLE 10

| ID | CustomerID | OrderAmount | OrderDate |
|---|---|---|---|
| 3001 | 1001 | 5.99 | Jan. 15, 2006 |
| 3002 | 1001 | 10.99 | Jan. 19, 2006 |
| 3003 | 1001 | 15.99 | Mar. 05, 2006 |
| 3004 | 1002 | 9.99 | Feb. 15, 2006 |
| 3005 | 1002 | 10.99 | Feb. 16, 2006 |
| 3006 | 1003 | 9.99 | Mar. 15, 2006 |
| 3007 | 1003 | 19.99 | Aug. 15, 2006 |

With regard to step 402, there are two sources of data from which data will be queried. Thus, two Data Source entities need to be created, as shown in Table 11.

TABLE 11

| Source ID | Source Name | Source Type | Source Alias |
|---|---|---|---|
| 1 | CUSTOMERS | TABLE | CUST |
| 2 | ORDERS | TABLE | ORD |

In this example, Source Type indicates what the source is, such as a Table, View, or Select statement, for example. Source name is the table or view name. Source Alias is used to refer to the SQL correlation name (i.e., table alias) in the SQL SELECT statement.

With regard to step 404, a condition needs to be defined in metadata for each pair of data sources that can be joined in order to support joining records from one table with records in another table. Table 12 provides an example table of Data Source Joins.

TABLE 12

| Left Source ID | Right Source ID | JOIN_CLAUSE |
|---|---|---|
| 1 | 2 | (CUSTOMERS.ID=ORDERS.CustomerID) |

In various embodiments, this condition will become part of the SQL WHERE clause. Other implementations may use the alias name instead of the table name defined in the data sources table. For example, instead of using "CUSTOMERS.ID", the syntax "$left_alias$.ID" may be used, which is translated to "CUST.ID."

With regard to step 406, for the given example, one data rule called CustomerOrders is created. Table 13 defines the CustomerOrder data rule.

TABLE 13

| Data Rule ID | Data Rule Name |
|---|---|
| 1 | CustomerOrders |

With regard to step 408, in order to access the data rule, both the data rule name and operation (i.e., the access method) should be defined. Operations may represent the available actions a data rule can execute. While the operations may be named arbitrarily, in various embodiments, they may adhere to one of the following SQL constructs:

1) Select: Read only data access using the data rule.
2) Delete: Delete a record (or set of records) in the database.
3) Insert: Insert a new record (or set of records) in the database.
4) Update: Update a record (or set of records) in the database.
5) Custom: Execute a custom SQL script. This could include any combination of inserts, updates, deletes, or external system calls (e.g., WebService) to obtain a result.

Table 14 define example operations for the CustomerOrders Data Rule.

TABLE 14

| Operation ID | Data Rule ID | Operation Type | Operation Name |
|---|---|---|---|
| 1 | 1 | 1 | Select |
| 2 | 1 | 2 | DeleteByCustomerID |
| 3 | 1 | 2 | DeleteByOrderID |
| 1 | 1 | 3 | InsertOrder |

There is no limit placed on the number of operations a data rule can support.

With regard to step 410, once a data rule has been created and the corresponding operations are defined, attributes may be added to the data rule. Based on the example, intrinsic attributes may be built for the following database fields: customer id, first name, last name, order id, order amount, order date, and order month. Additionally, derived attributes, such as an attribute for summing an order amount using a SQL analytic expression may be established.

Table 15 defines example attributes by specifying the translation formulas and the required data source needed for each attribute.

TABLE 15

| Data Rule ID | Attribute ID | Attribute | Translation Formula |
|---|---|---|---|
| 1 | 1 | CUSTOMER_ID | CUSTOMER_ID |
| 1 | 2 | FIRST_NAME | FIRST_NAME |
| 1 | 3 | LAST_NAME | LAST_NAME |
| 1 | 4 | ORDER_AMOUNT | ORDER_AMOUNT |
| 1 | 5 | ANALYTIC_ORDER_AMOUNT | SUM(ORDER_AMOUNT) OVER ($partition_by$) |
| 1 | 6 | ORDER_DATE | ORDER_DATE |
| 1 | 7 | ORDER_ID | ORDER_ID |
| 1 | 8 | ORDER_MONTH | TO_CHAR(TO_DATE(ORDER_DATE, 'MON-DD-YYYY'),'MON YYYY') |

In the given example, "partition_by" is a variable used by the ANALYTIC_ORDER_AMOUNT translation formula. Accordingly, it would be defined in the Params block for the ANALYTIC_ORDER_AMOUNT attribute.

In various embodiments, an attribute may have several possible sources from which it can be queried. In such situations, a table may be established to map a single attribute to many sources.

With regard to step 412, limits may be defined in a table, such as Table 16.

TABLE 16

| Data Rule Name | Limit | Translation Formula |
|---|---|---|
| CustomerOrders | EQUAL | ($meta$='$a$') |
| CustomerOrders | GREATER_THAN | ($meta$ > '$a$') |

With regard to step 414, functions may be defined in a table, such as Table 17.

TABLE 17

| Data Rule Name | Function | Translation Formula |
|---|---|---|
| CustomerOrders | COLUMN_SUM | SUM($a$) OVER( ) |

EXAMPLES

With these example definitions in place, various different combinations of SQL statements from Alchemy expressions may be created. Examples of SQL statements that can be achieved include:

1) Query for any combination of the attributes defined on the CustomerOrders data rule.
2) Limit results based on any attribute's equality to some value.
3) Perform a function on any attributes.
4) Perform an analytic SQL query.

The following implementations demonstrate various examples of the kinds of Alchemy expressions that can be used and their corresponding SQL statements that are generated based on the data rule definitions in the above tables.

Example 1

Query for Customer Orders

A first example performs a query of CustomerOrders to retrieve all available attribute values. This task is analogous to a "select * from CustomerOrders" query. The data rule request syntax for the request 19 (FIG. 1) may be similar to the following:

```
<DATA_RULE name="CustomerOrders" operation="Select"
    version="1">
        <ATTRIBUTES>
            <ATTRIBUTE meta="CUSTOMER_ID"
            alias="CUSTOMER_ID"/>
            <ATTRIBUTE meta="FIRST_NAME"
            alias="FIRST_NAME"/>
            <ATTRIBUTE meta="LAST_NAME"
            alias="LAST_NAME"/>
            <ATTRIBUTE meta="ORDER_ID"
            alias="ORDER_ID"/>
            <ATTRIBUTE meta="ORDER_AMOUNT"
            alias="ORDER_AMOUNT"/>
            <ATTRIBUTE meta="ORDER_DATE"
            alias="ORDER_DATE"/>
            <ATTRIBUTE meta="ORDER_MONTH"
            alias="ORDER_MONTH"/>
        </ATTRIBUTES>
        <LIMITS>
        </LIMITS>
</DATA_RULE>
```

This data rule request will generate the following SQL syntax for the data query 23 (FIG. 1):

```
SELECT
    customers.CUSTOMER_ID CUSTOMER_ID,
    customers.FIRST_NAME FIRST_NAME,
    customers.LAST_NAME LAST_NAME,
    orders.ORDER_ID ORDER_ID,
    orders.ORDER_AMOUNT ORDER_AMOUNT,
    orders.ORDER_DATE ORDER_DATE,
    TO_CHAR(TO_DATE(ORDER_DATE,
    'MON-DD-YYYY'),'MON YYYY')
    ORDER_MONTH
    FROM
        ORDERS orders,
        CUSTOMERS customers
    WHERE (customers = orders.CUSTOMER_ID)
```

As a result of the SQL query, the following values (Table 18) will retrieved from the database:

TABLE 18

| 1001 | JOHN | SMITH | 3001 | 5.99 | Jan. 15, 2006 | January 2006 | 1 |
| 1001 | JOHN | SMITH | 3002 | 10.99 | Jan. 19, 2006 | January 2006 | 2 |
| 1001 | JOHN | SMITH | 3003 | 15.99 | Mar. 5, 2006 | March 2006 | 3 |
| 1003 | ROGER | MOORE | 3007 | 19.99 | Aug. 15, 2007 | August 2007 | 4 |
| 1002 | JANE | DOE | 3005 | 10.99 | Feb. 16, 2006 | February 2006 | 5 |
| 1003 | ROGER | MOORE | 3006 | 9.99 | Mar. 15, 2006 | March 2006 | 6 |
| 1002 | JANE | DOE | 3004 | 9.99 | Feb. 15, 2006 | February 2006 | 7 |

Example 2

Query Customers with Sum on Order Amount

In a second example, the use of an example Function, called "COLUMN_SUM" on the "ORDER_AMOUNT" attribute is demonstrated. This Function performs a summation of all values in the ORDER_AMOUNT column. The data rule request syntax for the request 19 (FIG. 1) may be similar to the following:

```
<DATA_RULE name="CustomerOrders" operation="Select"
    version="1">
        <ATTRIBUTES>
            <!-- Type: NUMBER -->
            <ATTRIBUTE meta="CUSTOMER_ID"
            alias="CUSTOMER_ID"/>
            <!-- Type: STRING -->
            <ATTRIBUTE meta="FIRST_NAME"
            alias="FIRST_NAME"/>
            <!-- Type: STRING -->
            <ATTRIBUTE meta="LAST_NAME"
            alias="LAST_NAME"/>
            <!-- Type: NUMBER -->
            <ATTRIBUTE meta="ORDER_ID" alias="ORDER_ID"/>
            <!-- Type: NUMBER -->
            <ATTRIBUTE meta="ORDER_AMOUNT"
            alias="ORDER_AMOUNT"/>
            <!-- Type: STRING -->
            <ATTRIBUTE meta="ORDER_DATE"
            alias="ORDER_DATE"/>
                <FUNCTION type="COLUMN_SUM" alias="TOTAL">
                    <PARAMS>
                        <PARAM meta="a"
                        value="$ORDER_AMOUNT$"/>
                    </PARAMS>
                </FUNCTION>
        </ATTRIBUTES>
    <LIMITS>
        <!-- Placeholder: Define Global Limits -->
    </LIMITS>
</DATA_RULE>
```

This data rule request will generate the following SQL syntax for the data query request 23 (FIG. 1):

```
SELECT
    level_1.CUSTOMER_ID,
    level_1.FIRST_NAME,
    level_1.LAST_NAME,
    level_1.ORDER_ID,
    level_1.ORDER_AMOUNT,
    level_1.ORDER_DATE,
    SUM(ORDER_AMOUNT) OVER ( ) TOTAL
FROM
(
    SELECT
    customers.CUSTOMER_ID CUSTOMER_ID,
    customers.FIRST_NAME FIRST_NAME,
    customers.LAST_NAME LAST_NAME,
    orders.ORDER_ID ORDER_ID,
    orders.ORDER_AMOUNT ORDER_AMOUNT,
    orders.ORDER_DATE ORDER_DATE
    FROM
        ORDERS orders,
        CUSTOMERS customers
    WHERE (customers.ID = orders.CUSTOMER_ID)
    level_1
)
```

As a result of the SQL query, the following values (Table 19) will be retrieved from the database:

TABLE 19

| 1001 | JOHN  | SMITH | 3001 | 5.99  | Jan. 15, 2006 | 83.93 |
| 1001 | JOHN  | SMITH | 3002 | 10.99 | Jan. 19, 2006 | 83.93 |
| 1001 | JOHN  | SMITH | 3003 | 15.99 | Mar. 5, 2006  | 83.93 |
| 1002 | JANE  | DOE   | 3004 | 9.99  | Feb. 15, 2006 | 83.93 |
| 1002 | JANE  | DOE   | 3005 | 10.99 | Feb. 16, 2006 | 83.93 |
| 1003 | ROGER | MOORE | 3006 | 9.99  | Mar. 15, 2006 | 83.93 |
| 1003 | ROGER | MOORE | 3007 | 19.99 | Aug. 15, 2006 | 83.93 |

Example 3

Query Customers with Sum on Order Amount, with Limit of Order Amount>$10.00

In a third example, the data is queried to sum the orders exceeding $10.00. The data rule request syntax for the request 19 (FIG. 1) may be similar to the following:

```
<DATA_RULE name="CustomerOrders" operation="Select"
version="1">
    <ATTRIBUTES>
        <!-- Type: STRING -->
        <ATTRIBUTE meta="FIRST_NAME"
alias="FIRST_NAME"/>
        <!-- Type: STRING -->
        <ATTRIBUTE meta="LAST_NAME"
alias="LAST_NAME"/>
        <!-- Type: NUMBER -->
        <ATTRIBUTE meta="ORDER_AMOUNT"
alias="ORDER_AMOUNT" display="none"/>
            <FUNCTION type="SUM" alias="TOTAL">
                <PARAMS>
                    <PARAM
                        meta="a" value="$ORDER_AMOUNT$"/>
                </PARAMS>
            </FUNCTION>
    </ATTRIBUTES>
    <LIMITS>
        <!-- LIMIT TYPE: GREATER_THAN
                FORMULA: ($meta$ > '$a$')
                DESCRIPTION: Greater Than Limit -->
        <LIMIT type="GREATER_THAN"
meta="ORDER_AMOUNT">
            <PARAMS>
                <PARAM meta="a" value="10"/>
            </PARAMS>
        </LIMIT>
    </LIMITS>
```

This data rule request will generate the following SQL syntax for the data query request 23 (FIG. 1):

```
SELECT
    level_1.FIRST_NAME,
    level_1.LAST_NAME,
    SUM(ORDER_AMOUNT) TOTAL
FROM
(
    SELECT
        customers.FIRST_NAME FIRST_NAME,
        customers.LAST_NAME LAST_NAME,
        orders.ORDER_AMOUNT ORDER_AMOUNT
    FROM
        ORDERS orders,
        CUSTOMERS customers
    WHERE (customers.ID = orders.CUSTOMER_ID)
        AND (orders.ORDER_AMOUNT > '10')
) level_1
GROUP BY FIRST_NAME, LAST_NAME     )
```

As a result of the SQL query, the following values (Table 20) will retrieved from the database:

TABLE 20

| ROGER | MOORE | 19.99 |
| JOHN  | SMITH | 26.98 |
| JANE  | DOE   | 10.99 |

Example 4

Query Customers with Sum on Order Amount by Customer

The sum on order amount in Example 2 returned the total order amount across all customers in the result set. If the sub-total of order amount for each customer is desired, analytic SQL techniques may be employed. The "ANALYTIC_ORDER_AMOUNT" attribute may be used, whose translation function is written using analytic SQL:

```
SUM(ORDER_AMOUNT) OVER ($partition_by$)
```

As described in more detail below, the "$partition_by$" placeholder may be populated with any Params specified in the Params list for the attribute declaration. Accordingly, an analytic SQL query may be produced. The data rule request syntax for the request 19 (FIG. 1) may be similar to the following:

```
<DATA_RULE name="CustomerOrders" operation="Select"
version="1">
    <ATTRIBUTES>
        <ATTRIBUTE meta="ORDER_MONTH"
            alias="ORDER_MONTH"/>
        <ATTRIBUTE meta="LAST_NAME"
            alias="LAST_NAME"/>
        <ATTRIBUTE meta="ORDER_AMOUNT"
            alias="ORDER_AMOUNT"/>
        <!-- Type: NUMBER -->
        <ATTRIBUTE meta="ANALYTIC_ORDER_AMOUNT"
alias="ANALYTIC_ORDER_AMOUNT">
            <PARTITION_BY>
                <PARAMS>
                    <PARAM meta="LAST_NAME"/>
                </PARAMS>
            </PARTITION_BY>
        </ATTRIBUTE>
    </ATTRIBUTES>
    <LIMITS>
        <!-- Placeholder: Define Global Limits -->
    </LIMITS>
</DATA_RULE>
```

This data rule request will generate the following SQL syntax for the data query request 23 (FIG. 1):

```
SELECT
    level_1.ORDER_MONTH,
    level_1.LAST_NAME,
    level_1.ORDER_AMOUNT,
    level_1.ANALYTIC_ORDER_AMOUNT
```

-continued

```
        FROM
        (
                SELECT
                        TO_CHAR(TO_DATE(ORDER_DATE,
'MON-DD-YYYY'),'MON YYYY') ORDER_MONTH,
                        customers.LAST_NAME LAST_NAME,
                        orders.ORDER_AMOUNT ORDER_AMOUNT,
                        SUM(ORDER_AMOUNT) OVER (PARTITION BY
customers.LAST_NAME ORDER BY customers.LAST_NAME)
ANALYTIC_ORDER_AMOUNT,
                        ROW_NUMBER( ) OVER (PARTITION BY
TO_CHAR(TO_DATE(ORDER_DATE, 'MON-DD-YYYY'),'MON
YYYY'), customers.LAST_NAME, orders.ORDER_AMOUNT
ORDER BY TO_CHAR(TO_DATE(ORDER_DATE,
'MON-DD-YYYY'),'MON YYYY') asc, customers.LAST_NAME
asc, orders.ORDER_AMOUNT asc) RN
                FROM
                        ORDERS orders,
                        CUSTOMERS customers
                        WHERE (customers.ID = orders.CUSTOMER_ID)
        ) level_1
        WHERE RN=1
```

As a result of the SQL query, the following values (Table 21) will retrieved from the database:

TABLE 21

| 1 | February 2006 | DOE   | 9.99  | 20.98 |
| 2 | February 2006 | DOE   | 10.99 | 20.98 |
| 3 | August 2007   | MOORE | 19.99 | 29.98 |
| 4 | March 2006    | MOORE | 9.99  | 29.98 |
| 5 | January 2006  | SMITH | 5.99  | 32.97 |
| 6 | January 2006  | SMITH | 10.99 | 32.97 |
| 7 | March 2006    | SMITH | 15.99 | 32.97 |

Dynamically Translating Alchemy Expressions to SQL

In various embodiments, the code generation engine 12 (FIG. 1) translates an Alchemy expression into a SQL statement. Example algorithms and processes implemented by the code generation engine 12 (i.e., the Alchemy engine) to translate an Alchemy expression to SQL will now be described. The term "metabase" as used herein represents the translation formulas and other information the Alchemy engine requires for performing the translation. Once the metabase 25 (FIG. 1) has been defined, the Alchemy engine may:

1) Process Alchemy expressions for a given data rule, translating it to a SQL statement.

2) Execute the SQL statement.

3) Return results of the SQL statement to the caller, such as an application.

Figure 5:
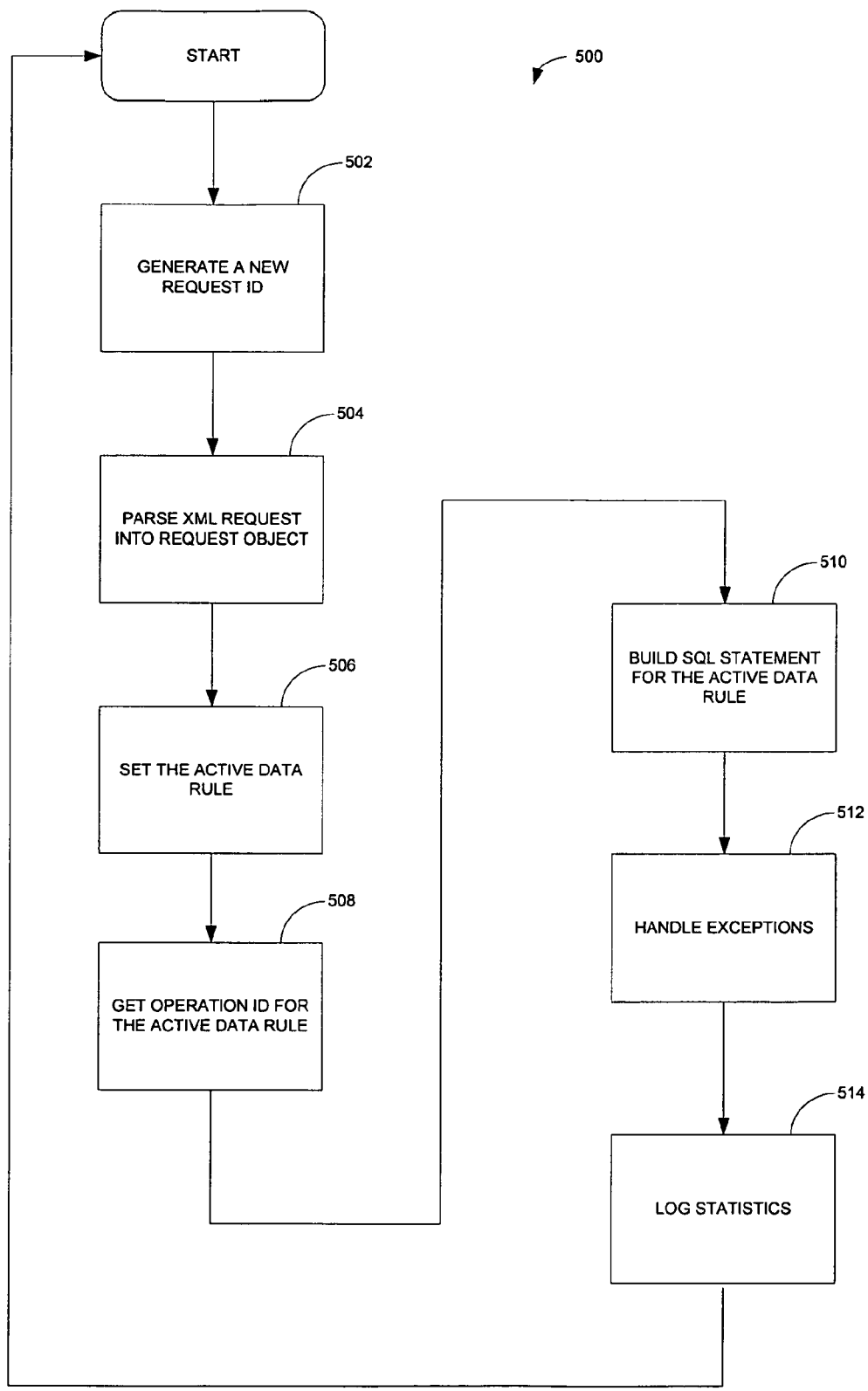
FIG. 5 is a flow diagram for generating an SQL query from an Alchemy expression according to one embodiment.

FIG. 5 illustrates an example process 500 for generating an SQL statement from an Alchemy expression. As may be appreciated, the various steps of the process may be performed in any suitable order. In some embodiments, more or less steps may be used. Process 500 may be performed by the processor 42 (FIG. 1) executing instructions from memory 34 (FIG. 1), for example. At step 502, a new Request ID is generated. At step 504, the XML requested is parsed into a request object. At step 506, the active data rule is set. At step 508, the operation ID for the active data rule is retrieved. At step 510, the SQL statement for the active data rule is built. At step 512, exceptions are handled. At step 514, statistics are logged.

With regard to step 502, each request that is processed may be given its own unique identifier. In one implementation, this step is implemented as an Oracle Sequence with a maximum value of 10 raised to the power of 27 (i.e, 1,000,000,000,000, 000,000,000,000,000).

With regard to step 504, in one embodiment, the XML Request 19 is parsed into an in-memory object model that the remaining steps access. The request object may, for example, contain the following properties:

```
xml_in              XMLType,
request_id          PLS_INTEGER,
debug_flag          BOOLEAN,
sql_only_flag       BOOLEAN,
save_results_flag   BOOLEAN,
distinct_rows_flag  BOOLEAN,
log_xml_flag        BOOLEAN,
prev_request_id     PLS_INTEGER,
start_row           PLS_INTEGER,
end_row             PLS_INTEGER,
sys_request_params  a_params,
user_request_params a_params,
user_macros         a_params,
data_rules          a_data_rules,
active_data_rule    r_data_rule
xml_in:             Incoming XML request info.
request_id:         Unique id generated at run time to
uniquely identify request.
    debug_flag:         Boolean to indicate if user requested
debug mode.    If so, debug logging will be performed.
    sql_only_flag:      Boolean to indicate whether or not the
primary results should be returned (if true, only the generated
query will be returned)
    save_results_flag:  Boolean to indicate whether or not to
save the results (from a select operation)
    distinct_rows_flag: Boolean to indicate that any returned
results should include on distinct records.
    log_xml_flag:       Boolean to indicate whether or not to
log the incoming XML.
    prev_request_id:    Optional incoming identifier which
signifies which previously cached request to use when building
result sets.
    start_row:          Starting row index for returned results
(used for paging data)
    end_row:            Ending row index for returned results
(used for paging data)
    sys_request_params: Array of system defined request
parameters loaded from SYS_REQUEST_PARAMS (allows for
defining which XML attributes / parameters are internally supported
at the REQUEST level)
    user_request_params: Array of user defined request
parameters loaded from USER_REQUEST_PARAMS (allows for
dynamic extension to sys request params and can be used in macro
definitions)
    user_macros:        Array of user defined macros (SQL
snippets) that can be are expanded at runtime when generating the
SQL statements.
    data_rules:         Array of data rules read from the
request info.
    active_data_rule:   Data rule record structure that
contains the currently processing data rule (in the case multiple
rules are submitted in one request)
    a_params is defined as an array of r_param.
    r_param is defined as:
        param_name VARCHAR2(255),
        param_value VARCHAR2(32000)
    param_name:         Parameter name (examples might include,
"a", "b", or in the case of OrderBy, a field name)
    param_value:        Parameter value for corresponding key
    a_data_rules is defined as an array of r_data_rule.
    r_data_rule is defined as:
        data_rule_row       DATA_RULES%ROWTYPE,
        operation_name      VARCHAR2(255),
        operation_type      PLS_INTEGER,
```

```
    operation_id            PLS_INTEGER,
    data_rule_index         PLS_INTEGER,
    db_link                 VARCHAR2(255),
    data_rule_params        a_params
    data_rule_row:          Record structure from DATA_RULES
table for a particular data rule.
    operation_name:         Name of Operation passed in via the XML
request
    operation_type:         Numeric representation for operation type
(insert, select, delete, update) This field is derived from the
incoming Data Rule and Operation Name.
    operation_id:           Numeric Operation ID from OPERATIONS
table. This field is derived from the incoming Data Rule and
Operation Name.
    data_rule_index:        Index of data rule (for supporting
multiple data rules in one request)
    db_link:                Link to remote database which is performs
remote query execution for the generated queries.
    data_rule_params:       Array of parameters passed in from the
incoming XML for the specified data rule.
```

With regard to step 506, it is possible that the request contains one or more data rules. In one implementation, each data rule will be processed in the order in which they appear in the request. Specifying multiple data rules in a single XML request 19 ensures that any combination of Update, Delete, or Insert operations, for example, are applied in a single transaction. If multiple Select operations are used, in one embodiment, the last select will be returned to the caller.

With regard to step 508, the Operation ID associated with the data rule name and operation name is determined. In addition, the remainder of the active data rule structure may be retrieved from the metadata definition of the operation, such as Operation Type, DB Link, for example. In various embodiments, an operation for a data rule request may consist of a sequence of steps to be executed by the Alchemy engine. For example, a delete operation may require deleting records from multiple tables. This task could be implemented as a single delete operation with multiple steps implemented in the metabase, or one step for each delete statement, for example.

With regard to step 510, this step may build the SQL statement (e.g., the data request 19), execute the SQL statement, and return the results to the caller (e.g., the result set 21). This step is discussed in more detail below with regard to FIG. 6.

With regard to step 512, any exceptions that may occur during the prior steps are handled; otherwise this step is skipped.

With regard to step 514, various statistics may be captured, such as start and end times and results codes, for example.

Figure 6:
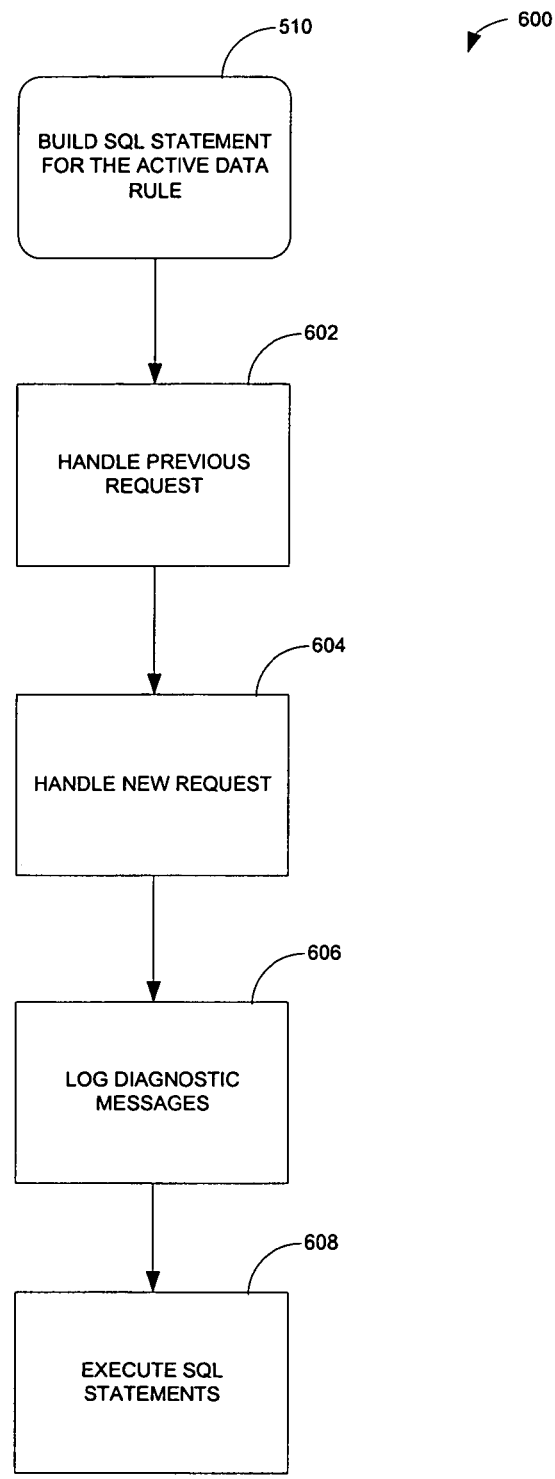
FIG. 6 is a flow diagram for building an SQL statement for a data rule according to one embodiment.

FIG. 6 illustrates step 510 (FIG. 5) in more detail according to various embodiments. Building the SQL statement for the active data rule may comprise a series of steps, tasks, or actions, shown as a process 600. As may be appreciated, the various steps of the process may be performed in any suitable order. In some embodiments, more or less steps may be used. Process 600 may be performed by the processor 42 (FIG. 1) executing instructions from memory 34 (FIG. 1), for example. At step 602, previous requests are handled. At step 604, new requests are handled. At step 606, diagnostic messages are logged. At step 608, SQL statements are executed.

With regard to step 602, an optional XML attribute is available in the Request element which directs the Alchemy engine to obtain cached data from a previously saved request. By using cached data, a new metabase derived SQL query does not need to be generated. This step is discussed in more detail below with regard to FIG. 7.

With regard to step 604, a new request is one that does not utilize a cached result set to obtain results. Since it is a new request, it will not have a prev_request_id. This request can take the form of any of the following: select, insert, update, delete, or a custom query, for example. It may, for example, be based on the operation type, such as 1=select, 2=delete, 3=insert, 4=update, and 5=custom, and is defined in the metabase for the operation_id. This step is discussed in more detail below with regard to FIG. 8.

With regard to step 606, this step may log the request id and start time prior to running the generated SQL.

With regard to step 608, SQL statements may be invoked. In various embodiments, Insert, Update, and Delete operations may process within a single transaction.

Figure 7:
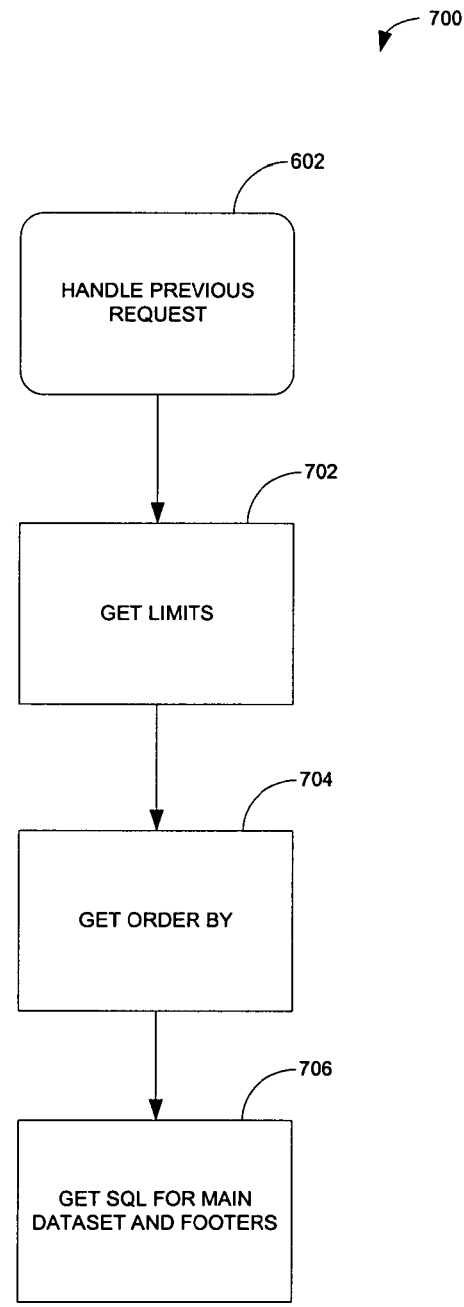
FIG. 7 is a flow diagram for handling previous requests according to one embodiment.

Referring now to FIG. 7, which further illustrates step 602 (FIG. 6), handling previous requests may comprise a series of steps, tasks, or actions, shown as a process 700. As may be appreciated, the various steps of the process may be performed in any suitable order. In some embodiments, more or less steps may be used. Process 700 may be performed by the processor 42 (FIG. 1) executing instructions from memory 34 (FIG. 1), for example. At step 702, limits are obtained. At step 704, an order by data rule is called. At step 706, the SQL for the main dataset and footers is obtained.

With regard to step 702, when requesting previous results, the caller may be able to limit the result set based on a limit filter criteria. For example, the content of any global limit criteria specified in the incoming XML request 19 may be read into a limit structure. In various embodiments, r_limit is defined as:

```
    limit_type              VARCHAR2(255),
    limit_param_name        VARCHAR2(255),
    limit_meta_name         VARCHAR2(255),
    limit_alias_name        VARCHAR2(255),
    limit_formula           LONG,
    limit_nesting_lvl       PLS_INTEGER,
    limit_formula_simplified LONG,
    limit_sources           a_sources,
    limit_meta_group_cd     attributes.meta_group_cd%TYPE,
    limit_params            a_params
    limit_type:             Limit type as defined in metabase.
Examples might include EQUAL, BETWEEN, IN, LIKE as well
as complex limits.
    limit_param_name:       A name which further distinguishes
limit types with the same name. Both the limit type and limit
param name make up the key for this structure.
    limit_meta_name:        Meta element name (function or
attribute) on which the limit should be applied.
    limit_alias_name:       Attribute / Function alias name on
which the limit should be applied.
    limit_formula:          SQL Formula snippet to get inserted
into query upon limit request. limit_nesting_lvl:   An internal
placeholder to identify which level in the subselect that the
limit should be applied.
    limit_formula_simplified: Limit formula represented at
higher nesting level (with alias reference instead of full formula
as declared in metabase)
    limit_sources: Array of sources for the specified limit
(determined at runtime based on limit meta name).
    limit_meta_group_cd: Code which groups different limits
types to a common source (determined at runtime based on limit
meta name)
    limit_params: Parameter structure used to store key / value
pairs from the incoming XML limit params.
```

In one embodiment, once the limits are read, any automatic limits (implied limits) are loaded as well. Implied limits provide the ability to filter data without the user explicitly including a limit in the XML request. These limits may be based on inclusion of specific attributes in the incoming XML and may be stored in the Alchemy metabase. With both explicit and implied limits loaded, the limit formula for each defined limit is determined.

This task may be performed by looking up the formula in the LIMITS table and replacing any dynamic meta parameters (e.g., $meta$) with the corresponding attribute aliases. In addition, any literal values may be replaced with their corresponding values (such as '$a$' with 999). Syntax for an example Limit is as follows:

```
<LIMIT type="EQUAL" alias="CUSTOMER_ID">
    <PARAMS>
        <PARAM meta="a" value="1001"/>
    </PARAMS>
</LIMIT>
```

When Alchemy processes this limit request, the LIMIT type may be compared to the LIMITS table and the following formula may be obtained: ($meta$='$a$'). Using the alias and parameter criteria, occurrences of the alias and parameter in the formula are substituted with the actual values specified in the XML request. So in this example, $meta$ becomes CUSTOMER_ID and $a$ becomes 1001. Other pre-defined limit types in the metabase may consist of: NOT_EQUAL, BETWEEN, IN, LIKE, GREATER_THAN, LESS_THAN, IS_NULL. This list may be expanded by adding records to the LIMIT table.

With regard to step 704, when requesting previous results, the caller is able to order the result set based on an 'Order By' criteria. This step may read the content of the Order By criteria specified in the incoming XML request 19 into a parameter structure (r_param) which contains the name of the fields to sort and the sort direction.

With regard to step 706, for a cached query result set (previous request), saved results may be stored in temporary tables or in XML format with their column names, column types, row data, and a request identifier, for example. To build a select statement to extract the cached results, first the valid column names may be retrieved. This step may be accomplished by binding an XML Field to a Table type and performing a select operation. In Oracle, for example, this task accomplished using syntax similar to the following:

```
Select . . . from xml_result_table a,
    TABLE(XMLSequence(extract(XMLType(a.xml_results),
    '/ROWSET/COLUMNS[1]/*'))) b
    where a.request_id = b.request_id
```

Once the field names and types have been determined a second select may be performed to get the actual saved query data. As part of the select operation, all fields are cast to their appropriate type. For number type in Oracle the following snippet can be used:

```
extract(value(b), '// C' || TO_CHAR(n_column_index) ||
    '/text ( )').getNumberVal( )
```

For string values the following snippet can be used:

```
REPLACE(extract(value(b), '//C' || TO_CHAR(n_column_index)
    || '/text( )').getStringVal( ),CHR(38) || "apos;",CHR(39))
```

In addition to constructing the SQL "Select . . . From" condition, Limit filters and Order By clauses may be appended to the statement prior to executing the query and returning the result set to the caller. This method may be repeated for the main and footer result sets.

Figure 8:
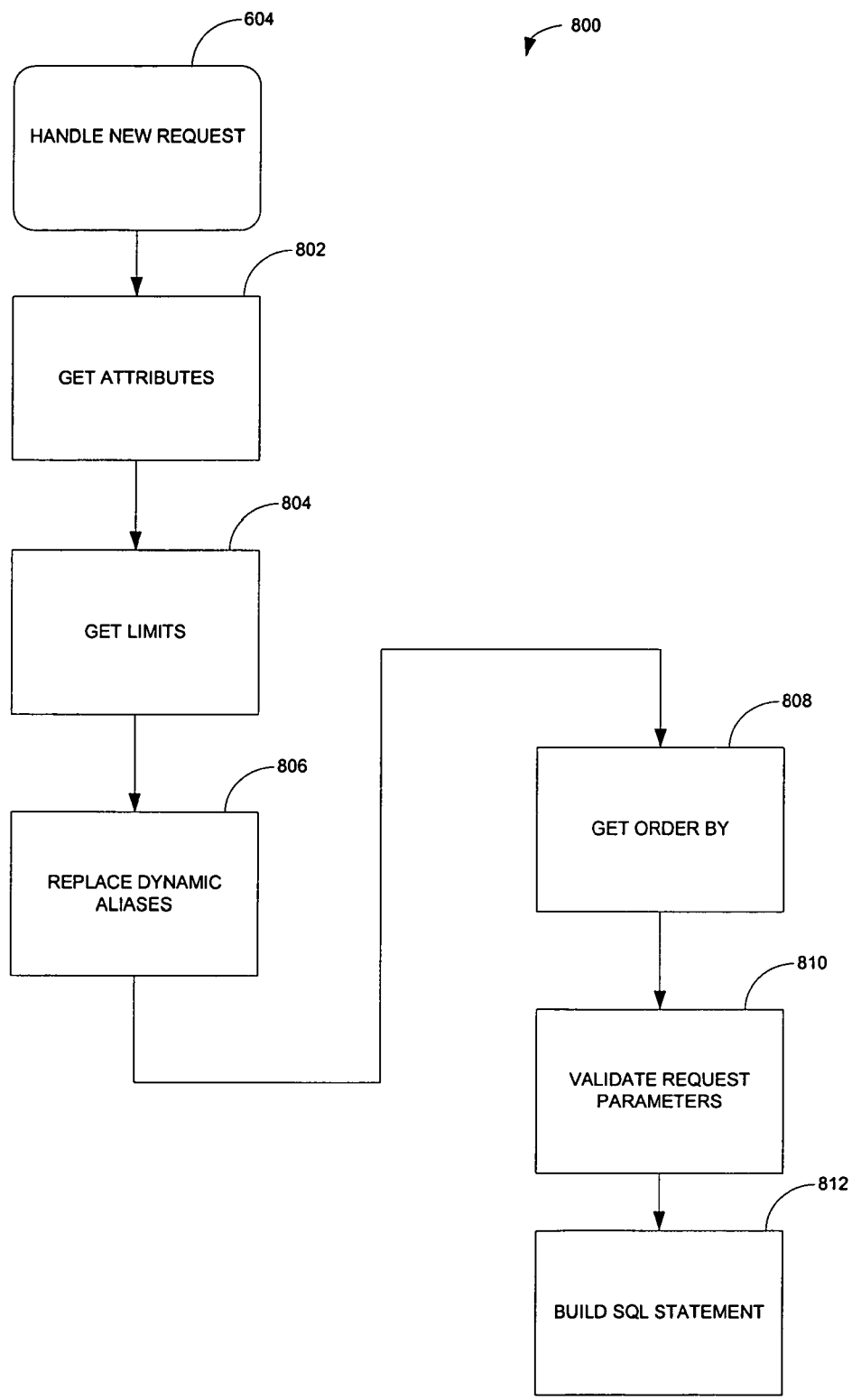
FIG. 8 is a flow diagram for handling new requests according to one embodiment.

Referring now to FIG. 8, which further illustrates step 604 (FIG. 6), handling new requests may comprise a series of steps, tasks, or actions, shown as a process 800. As may be appreciated, the various steps of the process may be performed in any suitable order. In some embodiments, more or less steps may be used. Process 800 may be performed by the processor 42 (FIG. 1) executing instructions from memory 34 (FIG. 1), for example. At step 802, attributes are obtained. At step 804, limits are obtained. At step 806, dynamic aliases are replaced. At step 808, an order by is obtained. At step 810, request parameters are validated. At step 812, the SQL statement is built.

With regard to step 802, when making a new request, the caller may specify which attributes will be used when constructing the query. The Get Attributes procedure reads in the attributes and functions from the incoming XML request 19. This step includes any parameters as well as any inline limits defined for the attribute. The storage structure for each attribute may be defined as follows:

```
TYPE r_attribute IS RECORD
(
    attribute_id                    PLS_INTEGER,
    function_id                     PLS_INTEGER,
    function_invalid_alias_list     a_string_list,
    attribute_meta_name
        attributes.meta_name%TYPE,
    attribute_param_name
        attributes.meta_param_name%TYPE,
    attribute_mode                  PLS_INTEGER,
    attribute_meta_type
        attributes.meta_type%TYPE,
    attribute_alias                 VARCHAR2(255),
    attribute_sources               a_sources,
    attribute_meta_group_cd
        attributes.meta_group_cd%TYPE,
    attribute_formula               attributes.formula%TYPE,
    attribute_auto_limit
        attributes.auto_limit%TYPE,
    attribute_nesting_lvl           PLS_INTEGER,
    attribute_inline_limits         a_limits,
    attribute_params                a_params,
    attribute_partition_by_params   a_params,
    attribute_display_mode          PLS_INTEGER,
    attribute_post_rownum           BOOLEAN,
    attribute_footer1_value         VARCHAR2(32000),
    attribute_footer2_value         VARCHAR2(32000),
    attribute_footer3_value         VARCHAR2(32000),
    attribute_footer4_value         VARCHAR2(32000),
    attribute_value                 VARCHAR2(32000),
    parse_info                      r_parse_info
);
    attribute_id:   Unique attribute identifier defined in
metabase.
    function_id:    Unique function identifier defined in
metabase (Note: only defined for 'function based attributes
<FUNCTION type=". . .">etc.)
    function_invalid_alias_list:   List of unknown aliases
```

```
provided in function declaration (for error logging)
    attribute_meta_name:    Field / Column Meta name defined in
meta layer.
    attribute_param_name:    Additional meta name identifier used
to distinguish it for other similar meta names. (Meta Name and
Param Name are the attribute primary key)
    attribute_mode:    Enumerated / Integer type used to
distinguish Intrinsic Attributes from Function based attributes.
    attribute_meta_type:    Attribute return type ('NUMBER',
'STRING', or 'DATE')
    attribute_alias:    User defined alias provided for an
attribute within the incoming XML.
    attribute_sources:    Array of valid sources for attribute.
    attribute_meta_group_cd:    Identifier used to group common
attributes together (denotes which attributes share a common
source).
    attribute_formula:    SQL snippet that replaces attribute
when building SQL statement.
    attribute_auto_limit:    Meta defined automatic limit upon
attribute inclusion.
    attribute_nesting_lvl:    Level at which attribute should be
added to select (0 = lowest/intrinsic, 1, 2, etc. will occur in
outer selects)
    attribute_inline_limits:    Limits read from incoming XML which
should applied to specific attribute (as opposed to global limit)
    attribute_params:    Parameters read from XML used as replace
params for formula and macros definitions.
    attribute_partition_by_params:    'Partition by' params to
build analytic OVER ( ) SQL clauses.
    attribute_display_mode:    Result set(s) in to include the
attribute (Main, Footer1, Footer2, Footer3, Footer4, All, None)
    attribute_footer1_value:    Override value for attribute when
present in footer 1 result set.
    attribute_footer2_value:    Override value for attribute when
present in footer 2 result set.
    attribute_footer3_value:    Override value for attribute when
present in footer 3 result set.
    attribute_footer4_value:    Override value for attribute when
present in footer 4 result set.
    attribute_value:    User defined value applied when performing
inserts / updates.
    parse_info:    Structure to store XML parsing info/errors.
```

In the case of a select operation, these are the fields which will be displayed in the result set (and can include both attributes and functions). In the case of an insert or an update statement, these are the attributes which will have their corresponding column values updated. Since delete queries do not support a column list, attributes are not required for delete operations. As the attributes are being read, several additional helper methods are used to further fill in the attribute structure. This step is discussed in more detail below with regard to FIG. 9.

With regard to step 804, when making a new results request, the caller is able to limit the result set based on a limit filter criteria. In one embodiment, this step reads the contents of any global limit criteria specified in the incoming XML request 19 into a limit structure.

With regard to step 806, within an attribute formula, some source aliases might not be known until runtime. For such situations, when defining attribute formulas in the metabase 25, a dynamic keyword can be used in place of an actual source alias. For example, if the keyword "$sys_alias$" is found in a formula definition, the correct source alias for the attribute is looked up in the metabase. For example, if all customer orders are queried by CUSTOMER_ID, CUSTOMER_ID may exist in both a CUSTOMER table (which also contains name and address information) as well as an ORDER table (which contains the order numbers by customer id). Without an alias prefix, a "column ambiguously defined" error may be received if both CUSTOMER and ORDER tables were used in the query. To avoid this situation, the "$sys_alias$" keyword can be added to the formula declaration and an entry inserted into the ATTRIBUTE_SOURCES metabase table. This directs the CUSTOMER_ID attribute to a specific source from which it should be obtained. The alias replacement is achieved by translating all $sys_alias$ definitions into their true source alias counterparts (as defined in the attribute-sources metabase table).

In the given example, "$sys_alias$.CUSTOMER_ID" would have been changed into "Customer.CUSTOMER_ID". Since it is possible that one attribute has more than one source, additional indexes may be used as part of the sys_alias keyword, (e.g, $sys_alias2$, $sys_alias3$, etc.) to denote which source index will be used.

With regard to step 808, the caller is able to order the result set based on an 'Order By' criteria. This step may read the contents of the Order By criteria specified in the incoming XML request 19 into a name/value pair structure.

With regard to step 810, the XML request 19 is validated to ensure that all the proper metabase definitions for the requested attributes, functions, limits are present. If any requested attributes, limits, or functions cannot be found in the metabase, then the process may exit and return error information.

With regard to step 812, building the SQL Statement for the data query 23 may consist of the algorithm discussed below with regard to FIG. 10.

Figure 9:
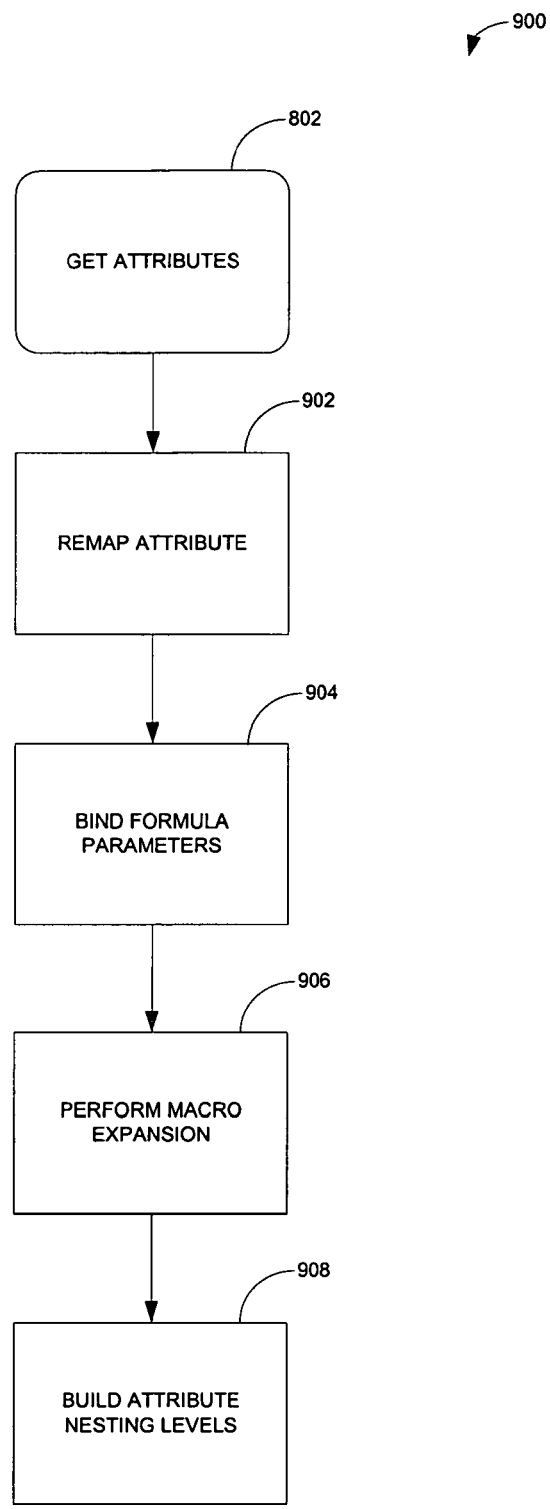
FIG. 9 is a flow diagram for getting attributes according to one embodiment.

Referring now to FIG. 9, which further illustrates step 802 (FIG. 8), getting attributes may comprise a series of steps, tasks, or actions, shown as a process 900. As may be appreciated, the various steps of the process may be performed in any suitable order. In some embodiments, more or less steps may be used. Process 900 may be performed by the processor 42 (FIG. 1) executing instructions from memory 34 (FIG. 1), for example. At step 902, the attribute is remapped. At step 904, formula parameters are bound. At step 906, macro expansions are performed. At step 908, attribute nesting levels are built.

With regard to step 902, while it is possible to overload an attribute formula and have its return field/value behave in different ways based on the incoming parameter list, this requires that "If-Then-Else" logic be placed in the formula declaration. This step can be achieved in Oracle by way of a Decode or Case function. However, to simplify the way in which a parameter (or set of parameters) influences an attribute formula and the attribute's potential source table(s), a parameter to attribute routing system is also available in various embodiments. This parameter to attribute mapping table defines an attribute, it's potential parameter values, and a new attribute to dynamically redirect to in the event a match is found in the incoming XML request 19.

With regard to step 904, once the attribute structure has been loaded, a routine may convert any dynamic parameters in the attribute or function formula definition to their actual values based on the incoming parameter list for the specified attribute.

With regard to step 906, in addition to attribute specific bind parameters, the Alchemy engine may also supports macro definitions. In various embodiments, Alchemy macros may provide a means for global parameter replacement (parameters that span multiple attributes) as well as way to provide runtime SQL scalar functions which can be used in any translation formulas, source definitions, or other macros.

In various embodiments, once all attributes have been loaded, the Perform Macro Expansion routine is called for each attribute which contains a macro identifier. In one implementation, a macro is identified by a name enclosed within brackets "[<macro name>]". Each macro found may then be replaced by the corresponding macro function definition from the meta defined macros Table 22.

TABLE 22

| Macro ID | Macro Name | Macro Function |
|---|---|---|
| 1 | CUSTOMER_DISCOUNT_PCT | Select CUST_DISCOUNT from DISCOUNT_TABLE where CUSTOMER_ID = [CUSTOMER_ID] |
| 2 | NUMBER_OF_CUSTOMERS | SELECT COUNT(*) from CUSTOMERS where ACTIVE = 'Y' |

In this example, two macros are defined. The first macro is a globally defined discount amount applied to specific customer orders. Because the macro function includes [CUSTOMER_ID], and this identifier does not exist in the macro table, it is implied that CUSTOMER_ID exists in the global parameter section of any incoming data rule requests that use the CUSTOMER_DISCOUNT_PCT macro. Use of this macro may apply when showing a product list followed by product pricing. For Alchemy, a "Products" data rule may be defined that contains an "Item Amount" attribute. Part of the translation formula for Item Amount might point to a physical field in the database. The translation formula, however, could also include a customer discount amount using the following translation formula:

ITEM_AMOUNT - ( [CUSTOMER_DISCOUNT_PCT] * ITEM_AMOUNT)

The second record shown in the macro Table 22 demonstrates a scalar function used to count the number of active customers. By defining the number of customers in a macro, it can be reused in data rules and different calculations (e.g. Avg. Customer Order Amount=Sales Amount/[NUMBER_OF_CUSTOMERS] or Percent Online Users=Online Customers/[NUMBER_OF_CUSTOMERS])

With regard to step 908, to support Data Rule Functions, the ability to generate a nested SELECT statement may be required. When constructing a nested SELECT statement, all fields which are dependant on other (parent) fields can reside at a nesting level higher than the fields upon which they depend. The following example syntax demonstrates the nested SELECT concept:

```
-- LEVEL 1
-- Avg. Order Amount calculated at the higher nesting level
-- than function components (TOTAL_FOR_MONTH and
NUMBER_OF_ORDERS)
  SELECT TOTAL_FOR_MONTH,
  NUMBER_OF_ORDERS,
  (TOTAL_FOR_MONTH / NUMBER_OF_ORDERS)
  as AVG_ORDER_AMOUNT
  FROM
  (
      --- innermost select statement is LEVEL 0 ---
      SELECT SUM(ORDER_AMOUNT) as TOTAL_FOR_MONTH,
  COUNT(*) NUMBER_OF_ORDERS
      FROM ORDERS
      WHERE MONTH='01-JAN-09'
  )
```

In various embodiments, the Build Attribute Nesting Level step 908 determines at which nesting level each attribute and formula must exist in to order to generate a valid SQL SELECT query. Attributes defined in the Table 15 may be considered Level 0 and will be used to generate the innermost select statement of the resulting query. Functions defined in the Table 17 whose parameters consist only of Attributes may defined as Level 1 and will be used to generate the Level 1 select statement of the resulting query. Each function whose parameters include other functions, must have its nesting level defined as the maximum nesting level for its parameters "+1."

The following syntax is an example XML request 19 using Functions and dependencies to yield a three level select:

```
<?xml version="1.0"?>
<REQUEST start_row="1" end_row="100">
  <REQUESTOR>Auto-Generated</REQUESTOR>
  <DATA_RULE name="CustomerOrders" operation="Select" version="1">
    <ATTRIBUTES>
      <!-- Type: NUMBER -->
      <ATTRIBUTE meta="CUSTOMER_ID" alias="CUSTOMER_ID"/>
      <!-- Type: STRING -->
      <ATTRIBUTE meta="FIRST_NAME" alias="FIRST_NAME"/>
      <!-- Type: STRING -->
      <ATTRIBUTE meta="LAST_NAME" alias="LAST_NAME"/>
      <!-- Type: NUMBER -->
      <ATTRIBUTE meta="ORDER_AMOUNT" alias="ORDER_AMOUNT"/>
      <!--  FUNCTION NAME: COLUMN_SUM
             FORMULA: SUM($a$) OVER ( )
             DESCRIPTION: Get the analytic (non group by)
sum for a specified column alias -->
      <FUNCTION type="COLUMN_SUM" alias="ALL_ORDER_TOTAL">
        <PARAMS>
          <PARAM meta="a" value="$ORDER_AMOUNT$"/>
        </PARAMS>
      </FUNCTION>
      <!--  FUNCTION NAME: DIVIDE
             FORMULA:
```

-continued

```
DECODE($b$,0,0,ROUND(($a$/$b$),10))
        DESCRIPTION: Divide one column by another -->
        <FUNCTION type="DIVIDE" alias="PERCENT_TOTAL">
          <PARAMS>
            <PARAM meta="a" value="$ORDER_AMOUNT$"/>
            <PARAM meta="b" value="$ALL_ORDER_TOTAL$"/>
          </PARAMS>
        </FUNCTION>
      </ATTRIBUTES>
    <LIMITS>
      <!-- Placeholder: Define Global Limits -->
    </LIMITS>
  </DATA_RULE>
</REQUEST>
)
```

In this example, ALL_ORDER_TOTAL is dependent on the ORDER_AMOUNT field. Similarly, the PERCENT_TOTAL field is dependent on both ALL_ORDER_TOTAL and ORDER_AMOUNT. The result is each individual order amount can be compared to the total order amount (for all customers) as a percentage. Here is the corresponding SQL statement for the data request 23:

```
SELECT * FROM
(
  SELECT rownum as ROWINDEX, level_3.*
  FROM
  (
    SELECT level_2.*,
  DECODE(ALL_ORDER_TOTAL,0,0,
  ROUND((ORDER_AMOUNT/ALL_ORDER_TOTAL ),))
  PERCENT_TOTAL
    FROM
    (
      SELECT
      level_1.CUSTOMER_ID,
      level_1.FIRST_NAME,
      level_1.LAST_NAME,
      level_1.ORDER_AMOUNT,
      SUM(ORDER_AMOUNT) OVER ( ) ALL_ORDER_TOTAL
      FROM
      (
        SELECT
        customers.CUSTOMER_ID CUSTOMER_ID,
        customers.FIRST_NAME FIRST_NAME,
        customers.LAST_NAME LAST_NAME,
        orders.ORDER_AMOUNT ORDER_AMOUNT
        FROM
          ORDERS orders,
          CUSTOMERS customers
        WHERE (customers.CUSTOMER_ID =
orders.CUSTOMER_ID)
      ) level_1
    ) level_2
  ) level_3
)
WHERE ROWINDEX between 1 AND 100
```

Figure 10:
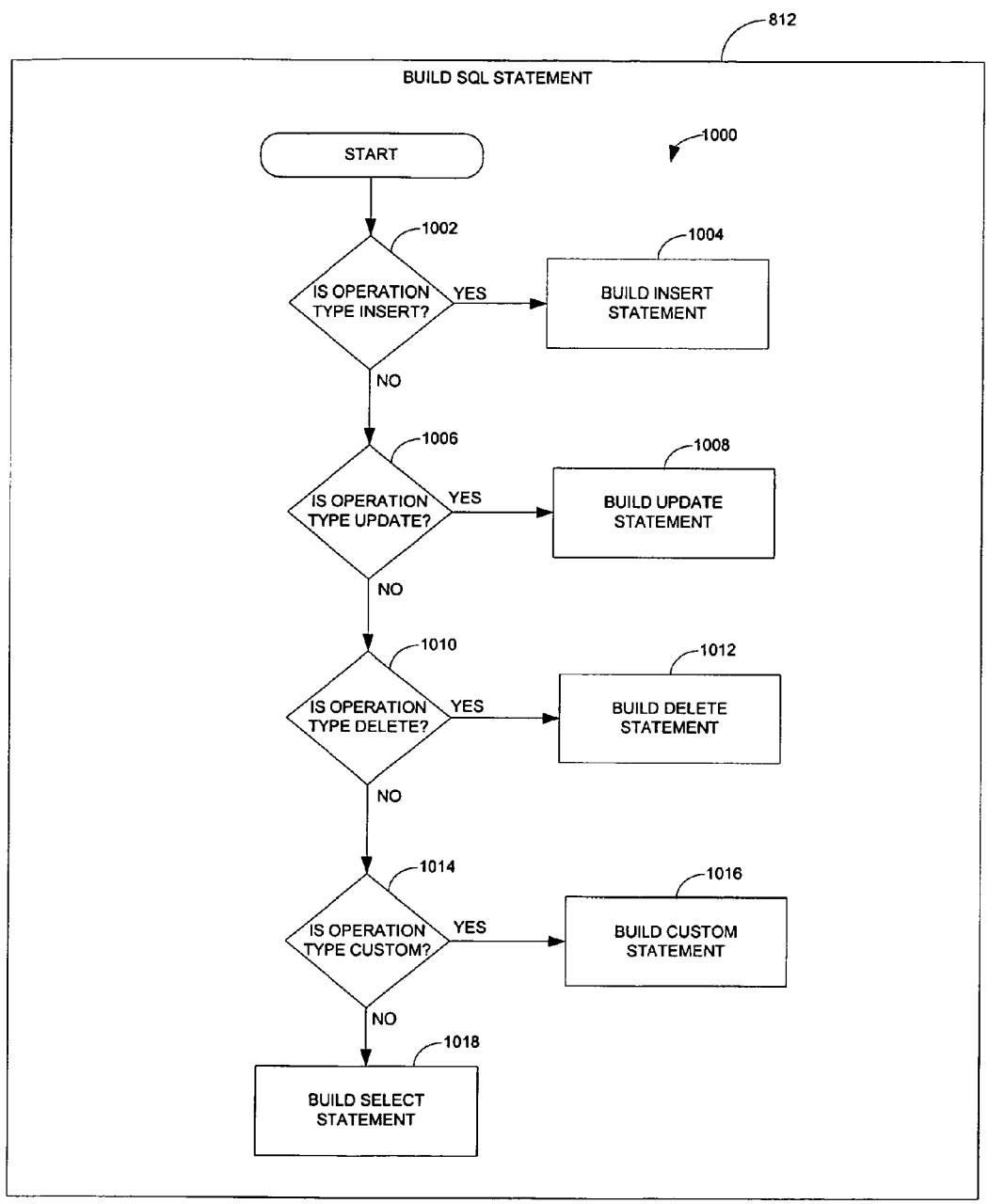
FIG. 10 is a flow diagram for building a select statement according to one embodiment.

Referring now to FIG. 10, which further illustrates step 812 (FIG. 8), building the SQL statement may comprise a series of steps, tasks, or actions, shown as a process 1000. At step 1002, if the operation type is an insert, an insert statement is built at 1004. At step 1006, if the operation type is an update, an update statement is built at 1008. At step 1010, if the operation type is a delete, a delete statement is built at 1012. At step 1014, if the operation type is custom, a custom statement is built at 1016. If the operation type is none of the above, a select statement is built at 1018. Building the select statement 1018 is discussed in more detail with regard to FIG. 11.

Figure 11:
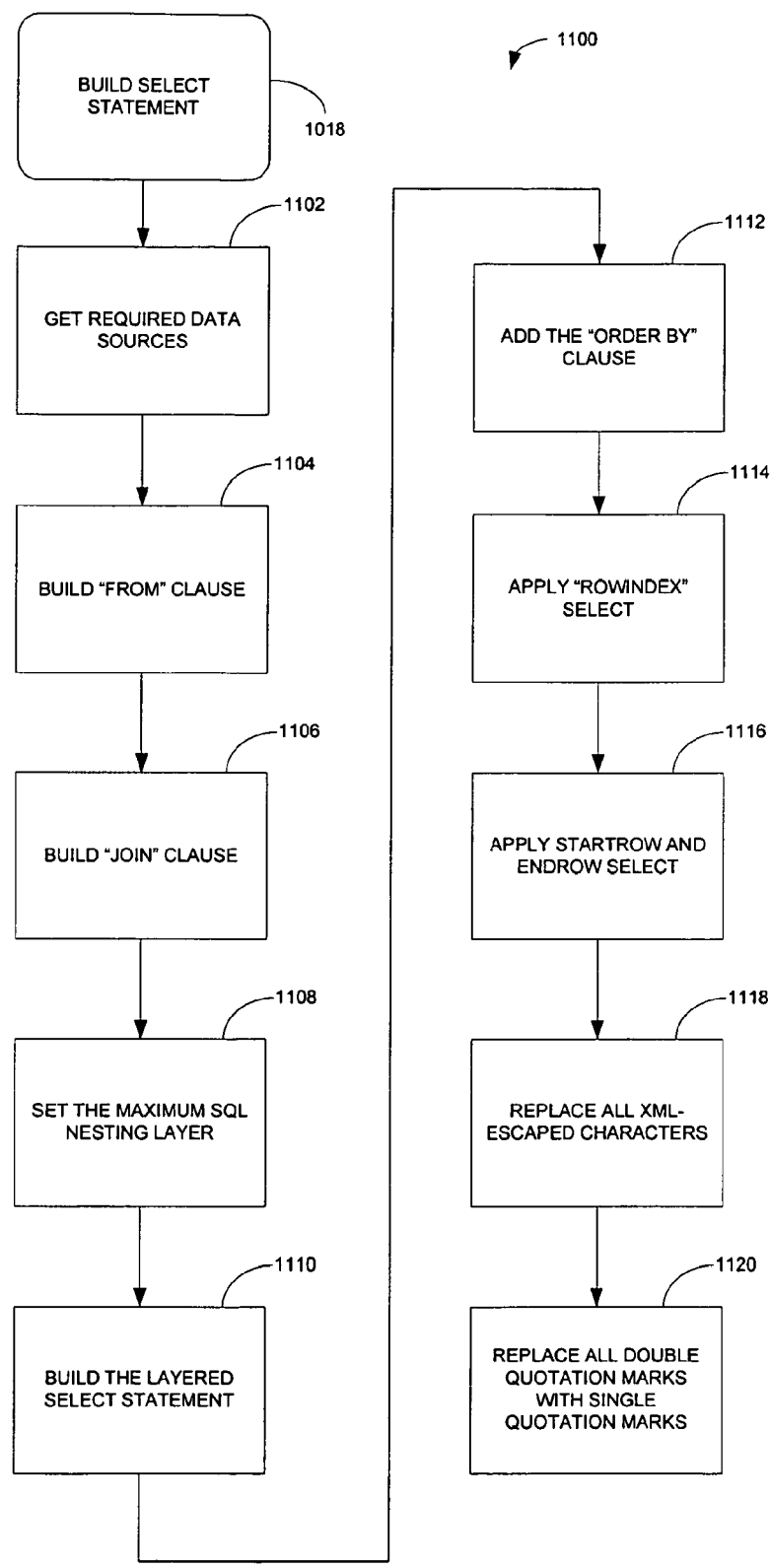
FIG. 11 is a flow diagram for building an insert statement according to one embodiment.

Referring now to FIG. 11, which further illustrates step 1018 (FIG. 10), as shown in FIG. 11, building the select statement may comprise a series of steps, tasks, or actions, shown as a process 1100. As may be appreciated, the various steps of the process may be performed in any suitable order. In some embodiments, more or less steps may be used. Process 1100 may be performed by the processor 42 (FIG. 1) executing instructions from memory 34 (FIG. 1), for example. At step 1102, required data sources are obtained. At step 1104, the "from" clause is built. At step 1106, the "join" clause is built. At step 1108, the maximum SQL nesting layer is set. At step 1110, the layered select statement is built. At step 1112, the "order by" clause is added. At step 1114, the "rowindex" select is applied. At step 1116, the startrow and endrow select is applied. At step 1118, all XML-escaped characters are replaced. At step 1120, all double quotation marks are replaced with single quotation marks. At this point, the SQL SELECT statement is complete and ready to be executed.

With regard to step 1102, various data sources may be retrieved that are required to retrieve data for any of the attributes, inline-limits, or global-limits present in the data rule request. In effect, each attribute, inline-limit or global limit must have a data source (Table, View, or a Select statement, for example) that can be queried to give the value of the attribute, inline-limit, or global-limit. For example, a CustomerID attribute on the CustomerOrders data rule may be mapped to the CUSTOMER_ID column of the CUSTOMER table.

In one embodiment, the following algorithm may be used. First, data source IDs for each attribute in the request are retrieved. Data sources required for the inline limits may be included. Next, get the data source IDs for each global limit in the request. Next, if the operation type is not a select operation (i.e. insert, update, or delete), then get the data source IDs for the current step within the operation. Next, the source-name, source-type, and source-alias for each data source ID obtained in the previous steps are retrieved.

In the given example, if CUSTOMER_ID, FIRST_NAME, LAST_NAME, and ORDER_AMOUNT attributes had been requested from the CustomerOrders table, Table 23 is the list of associated data sources.

TABLE 23

| Source-ID | Source-name | Source-type | Source-alias |
|---|---|---|---|
| 1 | CUSTOMERS | TABLE | CUST |
| 2 | ORDERS | TABLE | ORD |

With regard to step 1104, in various embodiments, the FROM clause is built from the SELECT statement. One general approach is to loop over the data sources and for each data source, append its source-name and source-alias to a string consisting of the following format:

"FROM" source-namei source-namei source-aliasi [","  source-namei+1 source-aliasi+1] ... [","  source-name n source-alias n]

Based on the example above, if CUSTOMER_ID, FIRST_NAME, and LAST_NAME attributes had been requested from the CustomerOrders table, then following string for the FROM CLAUSE would result:

FROM CUSTOMERS CUST, ORDERS ORD

With regard to step 1106, the conditions that will be used in the WHERE clause of the SELECT statement are built. Join conditions in the metabase may be defined for each pair of data sources that can be joined on one or more columns. Based on the example above, two required data sources would result: CUSTOMERS and ORDERS.

In various embodiments, step 1106 would query Table 12 for the JOIN_CLAUSE that matches the condition where the Left Source ID and the Right Source ID are both in the list of the required data sources determined in step 1102. For this example, the following would be obtained:

(CUST. ID = ORD. Customer_ID)

With regard to step 1108, the maximum nesting level required by all attributes and limits in the request is determined. In one embodiment, if the maximum nesting level is zero and if any of the attribute translation formulas include SQL analytic syntax, a nested select statement must be forced so the maximum nesting level may be set to one. In the example above, the maximum nesting level would be one.

With regard to step 1110, the layered select statement is built. In one embodiment, the nesting level is initialized to zero at the start. For each nesting level, get the list of fields to select for the level, get the list of where conditions for the level, and get the group by clause for the level. If the level is equal to zero, the SQL SELECT statement may be built as follows ("+" sign indicates string concatenation):

"SELECT" +
Optionally include "DISTINCT" +
List of fields to select for the level +
"FROM" +
Results from step 1104 +
"WHERE" +
Results from step 1106.

If there is a list of where conditions for the level, then "AND"+the list of conditions.
If the level is not equal to zero, a "wrapper" SQL SELECT may be built around the SQL generated for the level below the current level (i.e. if level=1 then wrap around level 0 and so forth):

"SELECT" +
Optionally include "DISTINCT" +
List of fields to select for the level +
"FROM ("+
The result SQL from previous pass through this loop +
") level_" + current loop level If there is a list of where conditions for the level and this is not an analytic query then:
 +"WHERE"+the list of conditions.
If there is a list of where conditions for the level and this is an analytic query and level equal one:
 +"WHERE"+list of where conditions for the level+"AND RN=1"
If there is not a list of where conditions for the level and this is an analytic query and level is equal to one then:
 +"WHERE RN=1"
If there is not a list of where conditions for the level and this is an analytic query and level is not equal to one then a WHERE clause is not needed.
If there is a group by clause of the level then:
 +"GROUP BY"+result of the listing of non-aggregate fields for the select nesting level.

With regard to step 1112, for each Order By parameter specified in the request, a corresponding SQL ORDER BY clause may be generated as follows:

"ORDER BY " param-metai param-valuei [","  param-metai+1 param-valuei+1] ... [","  param-metan param-valuen]

The resulting order by clause may be appended to the SQL SELECT query obtained in step 1110. The example request would result in the generation of the following ORDER BY clause:

ORDER BY LAST_NAME ASC, ORDER_AMOUNT DESC

With regard to step 1114, the SQL SELECT statement obtained in step 1112 may be wrapped with the following:

SELECT rownum as ROWINDEX, level_<level index>.*
FROM
(
<select statement from previous step>
) level_<level index>

With regard to step 1116, if the XML request 19 specified a start row and end row and the query is not cached, the select statement may be wrapped with the following:

SELECT *
FROM
(
<select statement from previous step>
)
WHERE ROWINDEX between <start row> and <last row>

With regard to step 1118, in various embodiments, all XML-escaped characters, such as 'apos;', 'gt;', and 'lt;' must be replaced to allow for a syntactically correct SQL statement. For example, 'apos;' may be replaced with a single apostrophe, 'gt;' may be replaced with ">", and 'lt;' may be replaced with "<".

With regard to step 1120, all double quotation marks may be replaced with single quotation marks. For example, when a SQL statement contains two consecutive single quotation marks, replace the first occurrence of two consecutive single quotation marks with a single quotation mark.

Figure 12:
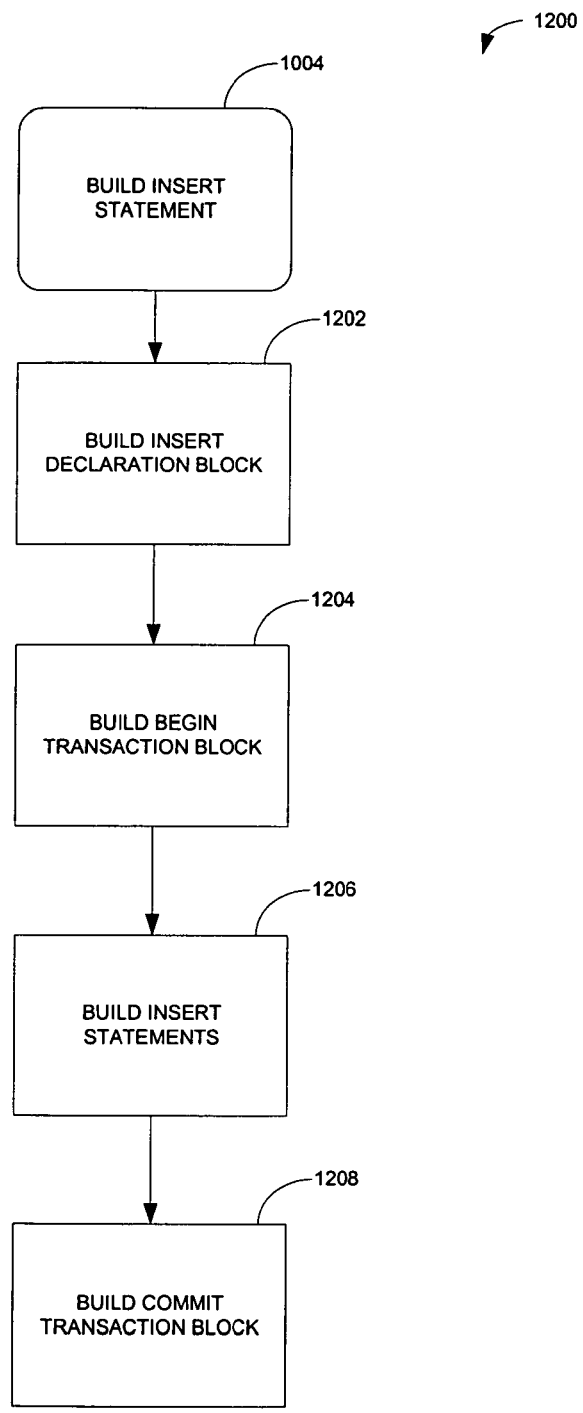
FIG. 12 is a flow diagram for building an insert statement according to one embodiment.

Referring now to FIG. 12, which further illustrates step 1004 (FIG. 10), building the insert statement may comprise a series of steps, tasks, or actions, shown as a process 1200. As may be appreciated, the various steps of the process may be performed in any suitable order. In some embodiments, more or less steps may be used. Process 1200 may be performed by the processor 42 (FIG. 1) executing instructions from memory 34 (FIG. 1), for example. At step 1202, the insert declaration block is built. At step 1204, the begin transaction block is built. At step 1206, the insert statements are built. At step 1208, the commit transaction block is built.

With regard to step 1202, sequences may be dynamically declared for use in later SQL steps.

With regard to step 1204, keywords for designating the start of a transaction for a series of SQL block can be made.

With regard to step 1206, in one embodiment, batch inserts are supported by allowing an insert operation to define one to "n" steps in the metabase. Each individual step will yield a single insert SQL statement. The information necessary to provide the ability to insert a value for an attribute into one or more Data Sources is stored in the metabase. Thus, the target source table for each step defined for the operation may be looked up and the attributes required to generate a correct SQL INSERT statement for the step can be determined. Table 24 provides example attributes:

TABLE 24

Attributes

Operation ID
Step Number
Source ID
Attribute ID
Default Value
A boolean value indicating whether the Attribute is required.
A boolean value indicating whether the Attribute is read only (i.e. if true can not be inserted).

In one embodiment, the algorithm for step 1206 is as follows. For each required step, get the Step Number and Source ID from the metabase for the operation, get the Source Name for the Source ID from the metabase, perform macro expansion on the Source Name, this is referred in the following steps as the "target table", get attribute-list for the request, and build a list of column names and their default values for the target table of the insert statement consisting of attributes where the following condition is true: Default Value in metabase is non-null AND the attribute was not found in the incoming request AND the attribute is required for the step. The algorithm may then iterate over the columns to handle any "SEQUENCE" columns. If the Default Value string contains ".nextval", add a variable for the sequence to the sequence-declarations-string and add the variable to the column-values-list. If the Default Value string contains ".currval", add the variable to the column-values-list. If the Default Value string does not contain ".currval" or ".nextval", add the Default Value string obtained from building the list of column names and their default values for the target table of the insert statement.

Next, get a list of attributes defined in the metabase for the current step. Build a column value list and a column name list for the insert statement. For each attribute in the request, if the attribute is defined for the current step, determine the name of the column that corresponds to the attribute for the target table. If the attribute has a value override, perform macro expansion on the value defined in the metabase. Otherwise, use the value that was passed for the attribute in the request. If attribute type is DATE or DATETIME then get date time mask that matches the column value and create a new column value with the following string: TO_DATE('<column-value>', '<date-time-mask>'). Next, set the column value to the string obtained in the previous step. If attribute type is STRING then create a new column value with the following string: '<column-value>'. Next, set the column value to the string obtained in the previous step. Append column value to the column value list and append column name to the column name list. The insert statement may be built as follows:

```
sequence-declarations-string +
"INSERT INTO" + target-table +
"COLUMNS(" + column name list + ")" +
"VALUES(" + column value list + ");"
```

With regard to step 1208, the following SQL may be appended to the SQL Statement generated in step 1206:

```
COMMIT;
EXCEPTION
WHEN OTHERS THEN
ROLLBACK;
RAISE;
END;
```

The examples presented herein are intended to illustrate potential and specific implementations of the embodiments. For example, an XML-based language and a SQL-based language are used in various examples. As may be appreciated, any other suitable computer programming language, programming code, or other syntax may be used. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details for computer systems are not described herein. Those of ordinary skill in the art will recognize, however, that these and other elements may be desirable in a typical computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are intended to include all such modifications, alterations, and adaptations without departing from the scope of the embodiments as set forth herein.

What is claimed is:

1. A computer system comprising:
    a computer database comprising a plurality of data tables;
    a computer device, comprising a processor and memory, that executes an application that requires data from the database; and
    a code generation engine, in communication with the computer device and the database, wherein the code generation engine comprises a processor circuit, a memory circuit, and a metadata database comprising computer database metadata, wherein the code generation engine is programmed to:
        receive a data request from the application, wherein the data request is in a first language, wherein the data request indicates a data rule and a plurality of attributes corresponding to the data rule; and
        translate the data request, using one or more translation formulas stored in the metadata database, to a plurality of data queries of the data tables of the computer database, wherein the plurality of data queries are in a second language that is different from the first language, wherein a first data query of the plurality of data queries returns a first data element stored at a first data table of the plurality of data tables as a first attribute of the plurality of attributes, and wherein a second data query of the plurality of data queries returns a result of an application of the one or more translation formulas to a second data element stored at a second table of the plurality of data tables as a second attribute of the plurality of attributes,
        wherein the first data query comprises a first SQL statement and the second data query comprises a second SQL statement, and wherein the code generation engine is also programmed to execute the first and second SQL statements, and, in response to the data request, return a result set to the application, wherein the result set comprises the first attribute and the second attribute.

2. The computer system of claim 1, wherein the first language is an XML-based language.

3. The computer system of claim 1, wherein the second language is a SQL-based language.

4. The computer system of claim 1, wherein the data rule comprises an element selected from the group consisting of an attribute, a function, and a limit.

5. A computer-implemented method for retrieving data from a database, the method comprising:
    storing data in a computer database comprising a plurality of data tables;
    receiving from an application, executed by a computer system comprising a processor and a memory, a data request in a first language, wherein the data request indicates a data rule and a plurality of attributes corresponding to the data rule; and
    translating with a code generation engine, comprising a processor circuit and a memory circuit, using one or more translation formulas stored in a metadata database, the data request to a plurality of data queries of the data tables of the computer database, wherein the plurality of data queries are in a second language that is different from the first language, wherein a first data query of the plurality of data queries returns a first data element stored at a first data table of the plurality of data tables as a first attribute of the plurality of attributes, and wherein a second data query of the plurality of data queries returns a result of an application of the one or more translation formulas to a second data element stored at a second table of the plurality of data tables as a second attribute of the plurality of attributes, wherein the first data query comprises a first SQL statement and the second data query comprises a second SQL statement, and wherein the code generation engine is also programmed to execute the first and second SQL statements, and, in response to the data request, return a result set to the application, wherein the result set comprises the first attribute and the second attribute, and wherein the code generation engine comprises a processor circuit, a memory circuit, and a metadata database comprising computer database metadata.

6. The method of claim 5, wherein the first language is an XML-based language.

7. The method of claim 5, wherein the second language is SQL-based language.

8. The method of claim 5, wherein the data rule comprises an element selected from the group consisting of an attribute, a function, and a limit.

9. The method of claim 5, further comprising storing a result set of the first and second data queries in a non-transitory computer readable medium.

10. A non-transitory computer readable medium having instructions stored thereon which when executed by a processor cause the processor to:
   store data in a computer database comprising a plurality of data tables;
   receive from an application, executed by a computer system comprising a processor and a memory, a data request in a first language, wherein the data request indicates a data rule and a plurality of attributes corresponding to the data rule;
   translate the data request, using one or more translation formulas stored in a metadata database, to a plurality of data queries of the data tables of the computer database, wherein the plurality of data queries are in a second language that is different from the first language, wherein a first data query of the plurality of data queries returns a first data element stored at a first data table of the plurality of data tables as a first attribute of the plurality of attributes, and wherein a second data query of the plurality of data queries returns a result of an application of the one or more translation formulas to a second data element stored at a second table of the plurality of data tables as a second attribute of the plurality of attributes, wherein the first data query comprises a first SQL statement and the second data query comprises a second SQL statement;
   execute the first and second SQL statements; and
   in response to the data request, return a result set to the application, wherein the result set comprises the first attribute and the second attribute.

11. The computer readable medium of claim 10, wherein the data request is XML-based and the one or more data queries are SQL statement.

12. The computer readable medium of claim 10, wherein the first language is XML-based and the second language is SQL-based.

13. The computer readable medium of claim 10, further comprising instructions to store query data into a memory.

* * * * *